US009648054B2

(12) United States Patent
Hamada

(10) Patent No.: US 9,648,054 B2
(45) Date of Patent: May 9, 2017

(54) METHOD OF REGISTERING TERMINALS IN A TRANSMISSION SYSTEM

(71) Applicant: Yuuta Hamada, Tokyo (JP)

(72) Inventor: Yuuta Hamada, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 257 days.

(21) Appl. No.: 14/484,635

(22) Filed: Sep. 12, 2014

(65) Prior Publication Data

US 2015/0081870 A1    Mar. 19, 2015

(30) Foreign Application Priority Data

Sep. 13, 2013  (JP) ................................ 2013-190850

(51) Int. Cl.
| | |
|---|---|
| H04L 29/06 | (2006.01) |
| H04L 12/18 | (2006.01) |
| H04M 3/493 | (2006.01) |
| H04L 29/08 | (2006.01) |
| H04M 3/56 | (2006.01) |
| H04N 7/15 | (2006.01) |

(52) U.S. Cl.
CPC ...... *H04L 65/1073* (2013.01); *H04L 12/1818* (2013.01); *H04L 63/08* (2013.01); *H04L 63/104* (2013.01); *H04L 67/16* (2013.01); *H04M 3/4931* (2013.01); *H04M 3/567* (2013.01); *H04M 2203/6009* (2013.01); *H04N 7/15* (2013.01)

(58) Field of Classification Search
CPC ............. H04L 65/1073; H04L 12/1818; H04L 63/104; H04L 41/00; H04N 7/152
See application file for complete search history.

(56) References Cited

U.S. PATENT DOCUMENTS

| | | | | |
|---|---|---|---|---|
| 5,051,837 A | * | 9/1991 | McJunkin | H04N 7/163 348/725 |
| 6,185,514 B1 | * | 2/2001 | Skinner | B21B 37/50 702/182 |

(Continued)

FOREIGN PATENT DOCUMENTS

| | | |
|---|---|---|
| EP | 2765753 A1 | 8/2014 |
| JP | 2006-074453 | 3/2006 |

(Continued)

OTHER PUBLICATIONS

Extended Search Report issued Mar. 13, 2015 in European Patent Application No. 14184337.5.
U.S. Appl. No. 14/484,507, filed Sep. 12, 2014.

*Primary Examiner* — Jimmy H Tran
(74) *Attorney, Agent, or Firm* — Oblon, McClelland, Maier & Neustadt, L.L.P.

(57) ABSTRACT

In view of the above, in one aspect of the present invention, in response to a request for registering a specific management terminal to be under management of a specific administrator, a transmission management system not only registers terminal identification information of the specific management terminal, to terminal identification information of management terminals being managed by the specific administrator, but also registers the terminal identification information of the specific management terminal from candidate counterpart terminal identification information for the other management terminals being managed by the specific administrator.

10 Claims, 17 Drawing Sheets

(56) References Cited

U.S. PATENT DOCUMENTS

| | | | | |
|---|---|---|---|---|
| 6,192,361 B1* | 2/2001 | Huang | H04L 63/083 | 455/26.1 |
| 6,446,119 B1* | 9/2002 | Olah | G06F 11/3423 | 709/223 |
| 6,873,824 B2* | 3/2005 | Flick | G07C 9/00182 | 340/426.3 |
| 7,020,628 B2* | 3/2006 | Peterson | G06F 21/00 | 379/230 |
| 7,167,919 B2* | 1/2007 | Iwamoto | G06F 21/604 | 709/229 |
| 7,428,585 B1* | 9/2008 | Owens, II | G06F 21/6218 | 709/223 |
| 7,451,478 B2* | 11/2008 | Yang | G06F 21/316 | 726/16 |
| 7,657,448 B2* | 2/2010 | Reddy | G06Q 10/02 | 705/5 |
| 7,774,363 B2* | 8/2010 | Lim | G06F 17/3089 | 707/781 |
| 7,860,525 B2* | 12/2010 | Parkkinen | H04L 12/66 | 370/310 |
| 7,890,569 B1* | 2/2011 | Stahl | G06F 21/552 | 705/59 |
| 8,417,815 B2* | 4/2013 | Yokoyama | H04L 41/0893 | 709/221 |
| 8,818,726 B1* | 8/2014 | Jones | G01C 21/3676 | 340/995.19 |
| 8,861,377 B2* | 10/2014 | Okuyama | H04L 65/1069 | 370/244 |
| 9,264,247 B2* | 2/2016 | Okuyama | H04L 65/1069 | |
| 9,307,197 B2* | 4/2016 | Kato | H04N 7/152 | |
| 2002/0143914 A1* | 10/2002 | Cihula | H04L 41/0893 | 709/223 |
| 2003/0023587 A1* | 1/2003 | Dennis | G06F 21/10 | |
| 2003/0065781 A1* | 4/2003 | Jex | H04L 29/12066 | 709/226 |
| 2003/0079037 A1* | 4/2003 | Donnelly | G06Q 10/10 | 709/232 |
| 2003/0126137 A1* | 7/2003 | McFadden | G06F 17/30604 | |
| 2004/0003279 A1* | 1/2004 | Beilinson | G06F 21/604 | 726/7 |
| 2005/0166204 A1* | 7/2005 | Takatsu | G06F 11/3466 | 718/100 |
| 2005/0272475 A1* | 12/2005 | Hahn | H04M 1/22 | 455/566 |
| 2006/0084455 A1* | 4/2006 | Schwagmann | H04W 4/10 | 455/518 |
| 2006/0168254 A1* | 7/2006 | Norton | G06F 9/3851 | 709/229 |
| 2007/0100944 A1* | 5/2007 | Ford | H04L 12/581 | 709/206 |
| 2007/0245102 A1* | 10/2007 | Kanda | G06F 3/0607 | 711/161 |
| 2008/0034411 A1* | 2/2008 | Aoyama | G06F 21/305 | 726/5 |
| 2008/0079536 A1* | 4/2008 | Palfi | G04G 15/006 | 340/5.42 |
| 2008/0155538 A1* | 6/2008 | Pappas | G06Q 30/02 | 718/100 |
| 2008/0243606 A1* | 10/2008 | Snyder | G06Q 10/0637 | 705/14.17 |
| 2009/0151006 A1* | 6/2009 | Saeki | G06F 21/10 | 726/28 |
| 2010/0199324 A1* | 8/2010 | Tanner | H04L 63/104 | 726/1 |
| 2010/0261488 A1* | 10/2010 | Little | H04L 12/1886 | 455/466 |
| 2011/0055227 A1* | 3/2011 | Igarashi | H04N 7/15 | 707/750 |
| 2012/0117238 A1* | 5/2012 | Yokoyama | H04L 41/0893 | 709/225 |
| 2013/0223292 A1* | 8/2013 | Okuyama | H04L 65/1069 | 370/261 |
| 2013/0242034 A1* | 9/2013 | Kato | H04N 7/152 | 348/14.08 |
| 2014/0038658 A1* | 2/2014 | Sato | H04L 63/104 | 455/519 |

FOREIGN PATENT DOCUMENTS

| | | |
|---|---|---|
| JP | 2014-155128 | 8/2014 |
| WO | WO 2012/074124 A1 | 6/2012 |

* cited by examiner

LOW RESOLUTION

INTERMEDIATE RESOLUTION

HIGH RESOLUTION

FIG. 8

| TERMINAL ID | PASSWORD |
|---|---|
| 01aa | aaaa |
| 01ab | abab |
| 01ac | acac |
| ... | ... |

FIG. 9

| TERMINAL ID | NAME | OPERATION STATE | DATE/TIME RECEIVED | IP ADDRESS |
|---|---|---|---|---|
| 01aa | AA TERMINAL | ONLINE (COMMUNICATION OK) | 2012.08.20.13:40 | 1.2.1.3 |
| 01ab | AB TERMINAL | OFFLINE | 2012.08.19.12:00 | 1.2.1.4 |
| ... | ... | ... | ... | ... |
| 01ba | BA TERMINAL | ONLINE (INTERRUPT) | 2012.08.20.13:45 | 1.2.2.3 |
| 01bb | BB TERMINAL | ONLINE (COMMUNICATION OK) | 2012.08.20.13:50 | 1.2.2.4 |
| ... | ... | ... | ... | ... |
| 01ca | CA TERMINAL | OFFLINE | 2012.08.20.12:45 | 1.3.1.3 |
| 01cb | CB TERMINAL | ONLINE (COMMUNICATING) | 2012.08.20.13:55 | 1.3.1.4 |
| ... | ... | ... | ... | ... |
| 01da | DA TERMINAL | ONLINE (COMMUNICATING) | 2012.08.18.12:45 | 1.3.2.3 |
| 01db | DB TERMINAL | ONLINE (COMMUNICATION OK) | 2012.08.20.12:45 | 1.3.2.4 |
| ... | ... | ... | ... | ... |

FIG. 10

| STARTING TERMINAL ID | CANDIDATE COUNTERPART TERMINAL ID |
|---|---|
| 01aa | 01ab, ···, 01ba, 01bb,···, 01ca, 01cb |
| 01ab | 01aa, 01ca, 01cb |
| 01ba | 01aa, 01ab, 01ca, 01cb, 01da, 01db |
| ··· | ··· |

FIG. 11

| GROUP ID | GROUP NAME | MANAGEMENT TERMINAL ID |
|---|---|---|
| G001 | FIRST SALES DIVISION | 01aa, 01ab |
| G002 | SECOND SALES DIVISION | 01ba, 01bb, 01bc |
| G003 | FIRST DEVELOPMENT DIVISION | 01ca, 01cb, 01cc |
| G004 | SECOND DEVELOPMENT DIVISION | 01da, 01db, 01dc |

FIG. 12

| ADMINISTRATOR ID | PASSWORD | GROUP ID |
|---|---|---|
| 02A | AAAA | G001, G002 |
| 02B | BBBB | G003 |
| 02C | CCCC | G004 |

FIG. 17

○ TERMINAL AUTHENTICATION:

TERMINAL ID [        ]

PASSWORD [        ]

[LOGIN]

⦿ ADMINISTRATOR AUTHENTICATION:

ADMINISTRATOR ID [        ]

PASSWORD [        ]

[NEW REGISTRATION] [LOGIN]

FIG. 18

ADMINISTRATOR REGISTRATION:

ADMINISTRATOR ID [        ]

PASSWORD [        ]

PASSWORD (CONFIRM) [        ]

[REGISTER] [CANCEL]

FIG. 19

| MANAGEMENT TERMINAL LIST: | | | LOGOUT |
|---|---|---|---|
| MANAGEMENT TERMINAL REGISTRATION | GROUP-BY-GROUP DELETION | | |

FIRST SALES DIVISION / SECOND SALES DIVISION

| NAME | TERMINAL ID | CANDIDATE COUNTERPART TERMINAL ID | |
|---|---|---|---|
| AA TERMINAL | 01aa | 01ab,···, 01ba, 01bb,···, 01ca, 01cb | DELETE |
| AB TERMINAL | 01ab | 01aa, 01ca, 01cb | DELETE |

FIG. 21

MANAGEMENT TERMINAL REGISTRATION:

MANAGEMENT TERMINAL GROUP ▼
- FIRST SALES DIVISION
- SECOND SALES DIVISION
- FIRST DEVELOPMENT DIVISION
- SECOND DEVELOPMENT DIVISION

REGISTRATION TERMINAL ID ☐
REGISTRATION TERMINAL ID ☐
REGISTRATION TERMINAL ID ☐

[REGISTER] [CANCEL]

FIG. 22

CONFIRMATION FOR GROUP DELETION:

The following group will be deleted. OK?

GROUP ID: G001
GROUP NAME: TOKYO OFFICE

[OK] [CANCEL]

FIG. 23

CONFIRMATION FOR MANAGEMENT
TERMINAL DELETION:

The following terminal will be deleted from
the Tokyo office group. OK?

TERMINAL ID: 01ab

TERMINAL NAME: AB TERMINAL

| OK | CANCEL |

METHOD OF REGISTERING TERMINALS IN A TRANSMISSION SYSTEM

CROSS-REFERENCE TO RELATED APPLICATIONS

This patent application is based on and claims priority pursuant to 35 U.S.C. §119(a) to Japanese Patent Application No. 2013-190850, filed on Sep. 13, 2013, in the Japan Patent Office, the entire disclosure of which is hereby incorporated by reference herein.

BACKGROUND

Technical Field

The present invention generally relates to managing candidate counterpart terminals.

Description of the Related Art

Communication systems that allow communication among a remotely located sites via a communication network such as the Internet have become popular. An example of such a communication system includes a videoconference system. For example, a terminal used by one of two parties that are holding a videoconference converts an image and sound of a subject in a conference room to digital data and transmits the digital data to a terminal used by the other party. The terminal used by the other party displays an image on a display and outputs sound from a speaker. Accordingly, a videoconference between remotely located sites can be held in a state that is similar to an actual conference.

In such a conference system, technology that registers a candidate counterpart terminal in a candidate list is available. Using the candidate list, a user at a terminal can easily call a terminal that serves as a candidate counterpart terminal to start communication.

On the other hand, many terminals are used in a large organization such as a company. In such environment, there is an administrator who manages terminals of users. For example, at the time a new terminal is purchased, the new terminal included to be under management of the administrator is not registered as a candidate counterpart terminal of other terminals that are already under management of the administrator. Thus, every time a new terminal is included to be under management of the administrator, the administrator registers the new terminal as a candidate counterpart terminal for the other terminals being managed by the administrator.

SUMMARY

In view of the above, in one aspect of the present invention, in response to a request for registering a specific management terminal to be under management of a specific administrator, a transmission management system not only registers terminal identification information of the specific management terminal, to terminal identification information of management terminals being managed by the specific administrator, but also registers the terminal identification information of the specific management terminal from candidate counterpart terminal identification information for the other management terminals being managed by the specific administrator.

For example, a transmission management system that manages a plurality of transmission terminals, includes: a memory that stores, first association information that associates administrator identification information for identifying an administrator with management terminal identification information for identifying one or more management terminals being managed by the administrator, and second association information that associates, for each one of the plurality of transmission terminals, terminal identification information for identifying a terminal with candidate counterpart terminal identification information for identifying one or more candidate counterpart terminals, to indicate that the terminal is capable of requesting to start communication with the candidate counterpart terminals; a receiver that receives a request for registering a specific management terminal to be under management of a specific administrator, the request including specific terminal identification information of the specific terminal to be registered and specific administrator identification information of the specific administrator; and a processing circuitry that registers the specific terminal identification information to the management terminal identification information being associated with the specific administrator identification information by the first association information, specifies one or more management terminals being managed by the specific administrator other than the specific terminal being registered using the first association information, and adds the specific terminal identification information of the specific terminal being registered, to candidate counterpart terminal identification information associated with each one of the other management terminals by the second association information.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIG. 8 is a conceptual diagram of a terminal authentication management database (DB);

FIG. 9 is a conceptual diagram of a terminal management DB;

FIG. 10 is a conceptual diagram of a candidate list management DB;

FIG. 11 is a conceptual diagram of a group management DB;

FIG. 12 is a conceptual diagram of an administrator management DB;

FIG. 17 is an illustration of an example authentication screen;

FIG. 18 is an illustration of an example administrator registration screen;

FIG. 19 is an illustration of an example management terminal list screen;

FIG. 21 is an illustration of an example management terminal registration screen;

FIG. 22 is an illustration of an example confirmation screen for management terminal deletion; and FIG. 23 is an illustration of an example confirmation screen for management terminal deletion.

Figure 1:
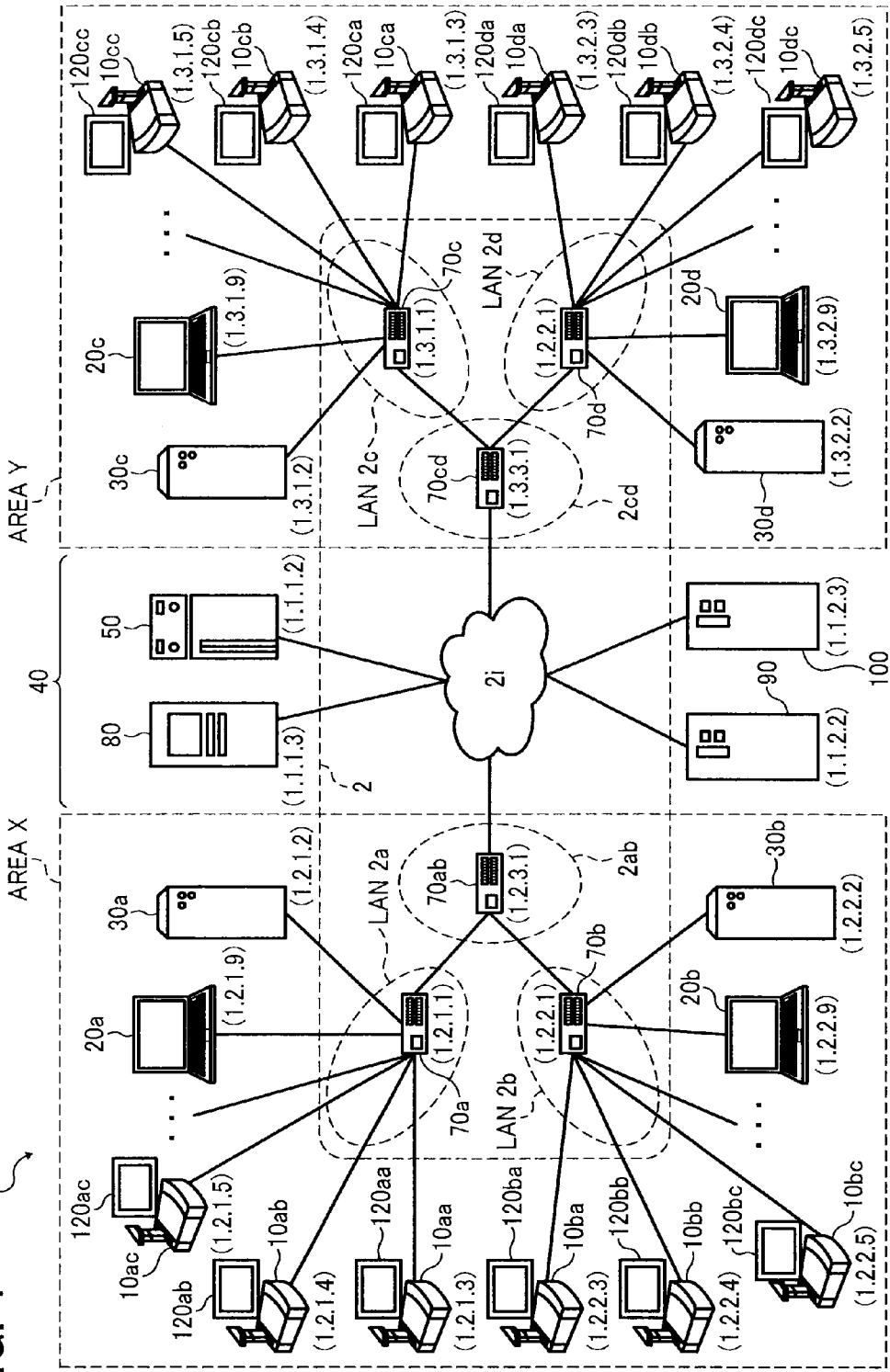
FIG. 1 is a schematic diagram of a transmission system according to an embodiment of the present invention.

The accompanying drawings are intended to depict example embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that operate in a similar manner.

In the following description, illustrative embodiments will be described with reference to acts and symbolic representations of operations (e.g., in the form of flowcharts) that may be implemented as program modules or functional processes including routines, programs, objects, components, data structures, etc., that perform particular tasks or implement particular abstract data types and may be implemented using existing hardware at existing network elements or control nodes. Such existing hardware may include one or more Central Processing Units (CPUs), digital signal processors (DSPs), application-specific-integrated-circuits, field programmable gate arrays (FPGAs) computers or the like. These terms in general may be referred to as processors.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Hereinafter, a transmission system 1 according to an embodiment of the present invention will be described referring to the drawings.

The transmission system 1 includes a communication system that intercommunicates information, feelings, or the like between a plurality terminals. The communication system is a system for intercommunicating information, feelings, or the like between a plurality of communication terminals (corresponding to "transmission terminals" in the embodiment) via a communication management system (corresponding to a "transmission management system"), and examples thereof include a teleconference system and a video conference system.

Figure 2:
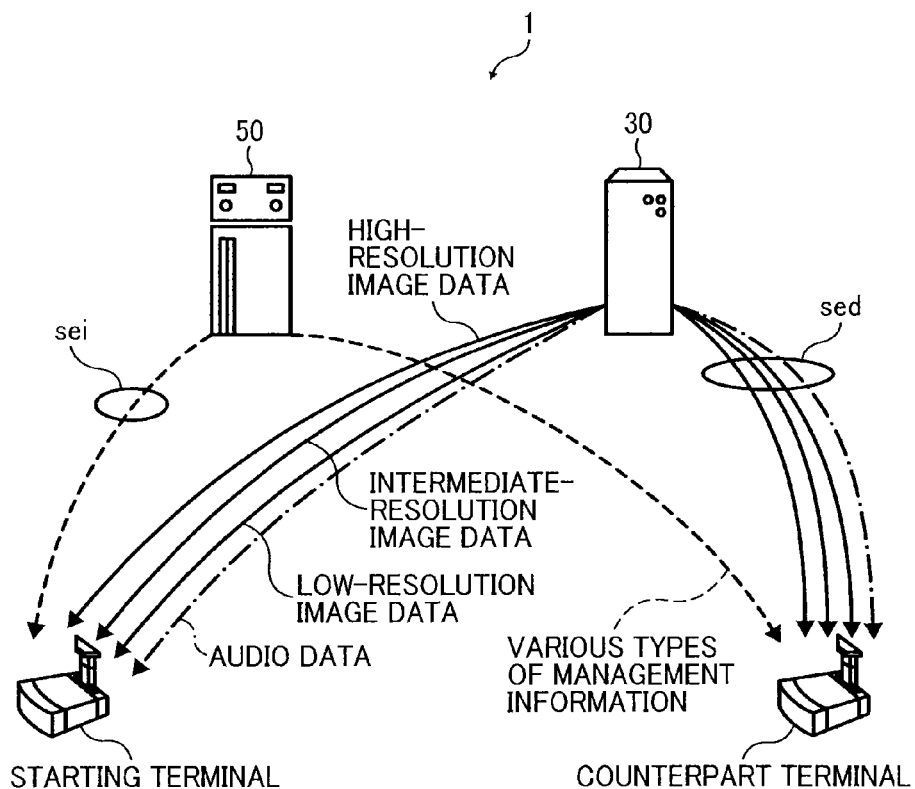
FIG. 2 is a conceptual diagram illustrating a transmission/reception of image data, sound data, and various types of information in the transmission system of FIG. 1.
Figure 3A:
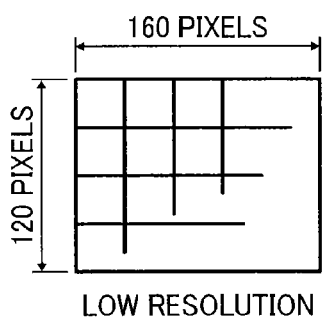
FIGS. 3A to 3C are conceptual diagrams describing the image quality of image data.
Figure 3B:
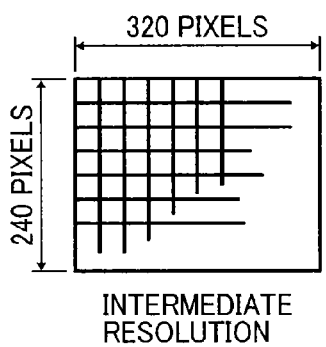
Figure 3C:
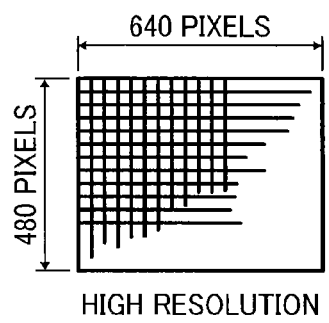

FIG. 1 is a schematic diagram of a transmission system according to the embodiment of the present invention. FIG. 2 is a conceptual diagram illustrating a transmission/reception of image data, sound data, and various types of information in the transmission system. FIGS. 3A to 3C are conceptual diagrams describing the image quality of the image data.

The transmission system 1 illustrated in FIG. 1 includes a plurality of transmission terminals (10$aa$, 10$ab$, . . . ), displays (120$aa$, 120$ab$, . . . ) for the respective transmission terminals (10$aa$, 10$ab$, . . . ), a plurality of administrator terminals (20$a$, 20$b$, 20$c$, and 20$d$), a plurality of relay devices (30$a$, 30$b$, 30$c$, and 30$d$), a transmission management system 40, a program providing system 90, and a maintenance system 100. Further, the transmission management system 40 includes a terminal management system 50 and a counterpart registration system 80.

The plurality of transmission terminals 10 each transmit and receive image data and sound data serving as examples of contents data. Note that another example of contents data includes text data. In addition, it is sufficient for contents data to include at least one of image data, sound data, and text data.

Hereinafter, an arbitrary one or ones of the plurality of transmission terminals (10$aa$, 10$ab$, . . . ) is/are represented as a "transmission terminal(s) 10", an arbitrary one or ones of the plurality of displays (120$aa$, 120$ab$, . . . ) is/are represented as a "display(s) 120", and an arbitrary one or ones of the plurality of relay devices (30$a$, 30$b$, 30$c$, and 30$d$) is/are represented as a "relay device(s) 30".

In the embodiment, a transmission terminal 10 serving as a request sender that gives a request to start communication such as a videoconference or the like is represented as a "starting terminal", and a transmission terminal 10 serving as a counterpart terminal (relay destination) that is a request destination is represented as a "counterpart terminal".

As illustrated in FIG. 2, a management information session sei for transmitting and receiving various types of management information is established via the terminal management system 50 between a starting terminal and a counterpart terminal in the transmission system 1. In addition, four sessions for transmitting and receiving four items of data, namely, high-resolution image data, intermediate-resolution image data, low-resolution image data, and sound data, are established via a relay device 30 between the starting terminal and the counterpart terminal. Here, these four sessions are collectively indicated as an image/sound data session sed. Note that it is not always necessary to have the relay device 30 between the starting terminal and the counterpart terminal; the image/sound data session sed may be established directly between the starting terminal and the counterpart terminal.

Here, the resolution of images of image data handled in the embodiment will be described. There are the following images: a low-resolution image, serving as a base image, having horizontal 160 pixels by vertical 120 pixels, as illustrated in FIG. 3A; an intermediate-resolution image having horizontal 320 pixels by vertical 240 pixels, as illustrated in FIG. 3B; and a high-resolution image having horizontal 640 pixels by vertical 480 pixels, as illustrated in FIG. 3C. In the case of communicating via a narrow band, low-quality image data that only includes low-resolution image data serving as a base image is relayed. In the case of communicating via a relatively wide band, intermediate-quality image data including low-resolution image data serving as a base image and intermediate-resolution image data is relayed. In the case of communicating via a very wide band, high-quality image data including low-resolution image data serving as a base image, intermediate-resolution image data, and high-resolution image data is relayed.

The relay devices 30 illustrated in FIG. 1 relay contents data between the plurality of transmission terminals 10. The terminal management system 50 centrally manages login authentication from the transmission terminals 10, the communication states of the transmission terminals 10, candidate lists of the transmission terminals 10, and the communication states of the relay devices 30, etc. Note that an image of image data may be a moving image or a still image, or may include both thereof.

A plurality of routers (70a, 70b, 70c, 70d, 70ab, and 70cd) select an optimal path for image data and sound data. Hereinafter, an arbitrary one or ones of the routers (70a, 70b, 70c, 70d, 70ab, and 70cd) is/are represented as a "router(s) 70".

The program providing system 90 includes a hard disk (HD) 204 described later. The HD 204 stores a transmission terminal program for causing a transmission terminal 10 to realize various functions (or for causing a transmission terminal 10 to function as various elements). For example, the transmission terminal program may be transmitted to the transmission terminal 10 to be downloaded onto the transmission terminal 10. The HD 204 of the program providing system 90 further stores a relay device program for causing a relay device 30 to realize various functions (or for causing a relay device 30 to function as various elements). For example, the relay device program may be transmitted to the relay device 30 to be downloaded onto the relay device 30.

Further, the HD 204 of the program providing system 90 stores a transmission management program for causing the terminal management system 50 to realize various functions (or for causing the terminal management system 50 to function as various elements). For example, the transmission management program may be transmitted to the terminal management system 50 to be downloaded onto the terminal management system 50. In addition, the HD 204 of the program providing system 90 stores a counterpart registration program for causing the counterpart registration system 80 to realize various functions (or for causing the counterpart registration system 80 to function as various elements). For example, the counterpart registration program may be transmitted to the counterpart registration system 80 to be downloaded onto the counterpart registration system 80. Note that the terminal management program and the counterpart registration program may be collectively referred to as a transmission management program.

In this example, the maintenance system 100 is implemented by one or more computers for performing maintenance, management, or conservation of at least one of the transmission terminals 10, the relay devices 30, the terminal management system 50, the counterpart registration system 80, and the program providing system 90. For example, in the case where the maintenance system 100 is located in one country, and the transmission terminals 10, the relay devices 30, the terminal management system 50, the counterpart registration system 80, or the program providing system 90 is/are located outside that country, the maintenance system 100 remotely performs, via a communication network 2, maintenance, management, or conservation of at least one of the transmission terminals 10, the relay devices 30, the terminal management system 50, the counterpart registration system 80, and the program providing system 90. The maintenance system 100 may perform maintenance such as management of the model number, serial number, sales contact, maintenance checkup, or a past history of failures of at least one of the transmission terminals 10, the relay devices 30, the terminal management system 50, the counterpart registration system 80, and the program providing system 90.

In this example, the transmission terminals (10aa, 10ab, 10ac, . . . ), the relay device 30a, and the router 70a are connected to be communicable with each other by a local area network (LAN) 2a. The transmission terminals (10ba, 10bb, 10bc, . . . ), the relay device 30b, and the router 70b are connected to be communicable with each other by a LAN 2b. In addition, the LAN 2a and the LAN 2b are connected to be communicable with each other by a dedicated line 2ab including the router 70ab and are provided in a certain area A. For example, assuming that the area A is an office in Tokyo, the LAN 2a is managed in the first sales division, and the LAN 2b is managed in the second sales division.

Further, in this example, the transmission terminals (10ca, 10cb, 10cc, . . . ), the relay device 30c, and the router 70c are connected to be communicable with each other by a LAN 2c. The transmission terminals (10da, 10db, 10dc, . . . ), the relay device 30d, and the router 70d are connected to be communicable with each other by a LAN 2d. In addition, the LAN 2c and the LAN 2d are connected to be communicable with each other by a dedicated line 2cd including the router 70cd and are provided in a certain area B. For example, assuming that the area B is an office in Osaka, the LAN 2c is managed in the first development division, and the LAN 2d is managed in the second development division. The area A and the area B are connected to be communicable with each other from the routers (70ab and 70cd), respectively, via the Internet 2i.

The terminal management system 50, the counterpart registration system 80, and the program providing system 90 are connected to be communicable with the transmission terminals 10 and the relay devices 30 via the Internet 2i. The terminal management system 50, the counterpart registration system 80, and the program providing system 90 may be located in the area A or the area B, or may be located in other areas.

The communication network 2 of the embodiment includes the LAN 2a, the LAN 2b, the dedicated line 2ab, the Internet 2i, the dedicated line 2cd, the LAN 2c, and the LAN 2d. The communication network 2 may include not only a wired network, but also a network where communication is performed wirelessly, such as Wireless Fidelity (WiFi) or Bluetooth (registered trademark).

In FIG. 1, four digits indicated below each of the transmission terminals 10, each of the relay devices 30, the terminal management system 50, each of the routers 70, the counterpart registration system 80, and the program providing system 90 indicates an IP address in an abbreviated form in the general Internet Protocol version 4 (IPv4). For example, the IP address of the transmission terminal 10aa is "1.2.1.3". Although IPv6 may be used instead of IPv4, IPv4 is used in order to make the description simple.

Note that the transmission terminals 10 may be used not only for communication between offices or between different rooms in the same office, but also for communication within the same room or for outdoor-indoor communication or outdoor-outdoor communication. In the case where the transmission terminals 10 are used outside, wireless communication using a cellular phone communication network or the like is performed.

<Hardware Configuration>

Figure 4:
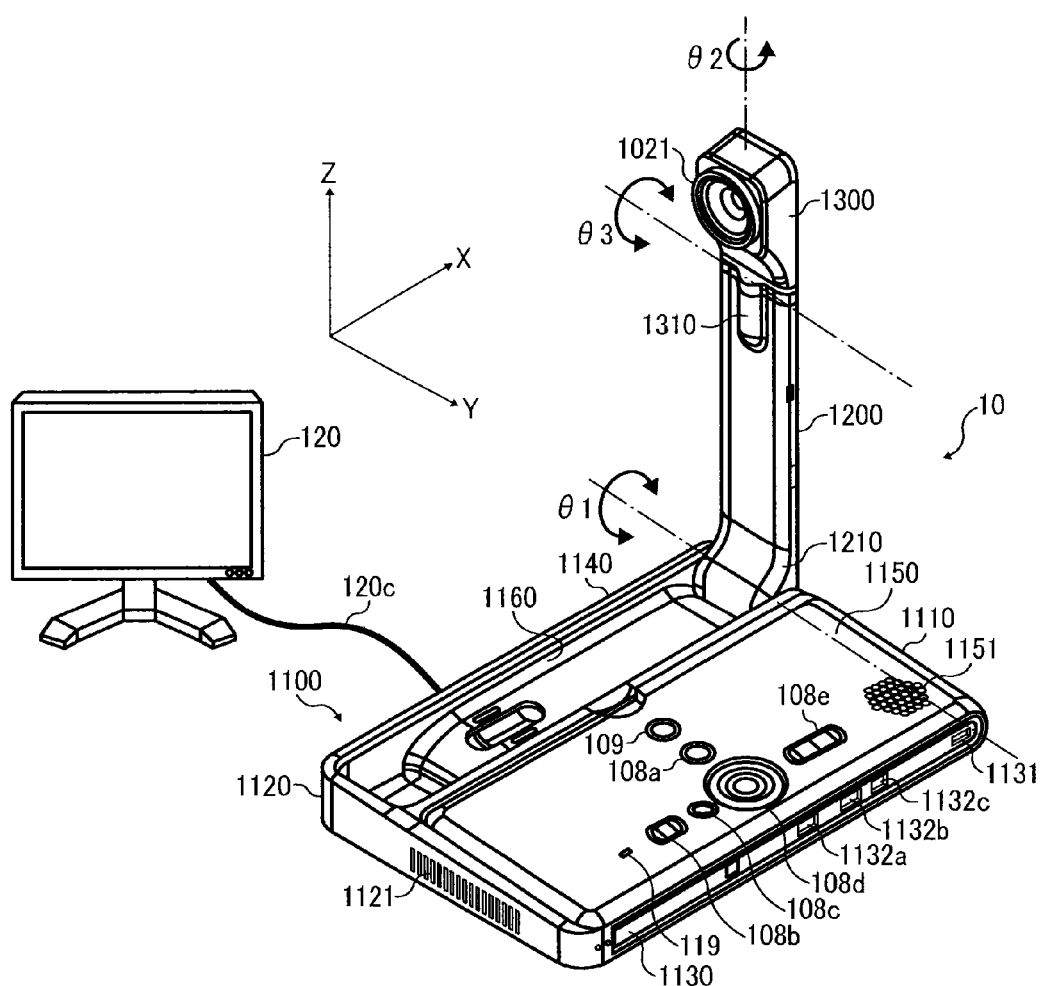
FIG. 4 is an external view of a transmission terminal of the transmission system of FIG. 1.

Next, referring to FIGS. 4 to 6, the hardware configuration of the transmission system 1 of this embodiment will be described. FIG. 4 is an external view of the transmission terminal 10. The description will be given assuming that the longitudinal direction of the transmission terminal 10 is the X-axis direction, a direction orthogonal to the X-axis direction on one plane is the Y-axis direction, and a direction orthogonal to the X-axis direction and the Y-axis direction (vertical direction) is the Z-axis direction.

As illustrated in FIG. 4, the transmission terminal 10 includes a casing 1100, an arm 1200, and a camera housing 1300. Among these portions, a front wall 1110 of the casing 1100 has an inlet face including a plurality of inlet holes, and a back wall 1120 of the casing 1100 has an exhaust face 1121 on which a plurality of exhaust holes are formed.

Accordingly, by driving of a cooling fan included in the casing 1100, air behind the transmission terminal 10 can be taken in via the inlet face and exhausted to the rear of the transmission terminal 10 via the exhaust face 1121. A right-side wall 1130 of the casing 1100 has a sound pickup hole 1131 formed thereon, and a built-in microphone 114, described later, is capable of picking up sound and noise.

An operation panel 1150 is formed toward the right-side wall 1130 of the casing 1100. The operation panel 1150 has a plurality of operation keys (108a to 108e), a power switch 109, and an alarm lamp 119, which are formed thereon. In addition, the operation panel 1150 has a sound output face 1151, which is formed of a plurality of sound output holes for allowing output sound from a built-in speaker 115 to pass through. In addition, an accommodation portion 1160 serving as a recess for accommodating the arm 1200 and the camera housing 1300 is formed toward a left-side wall 1140 of the casing 1100. A plurality of connection ports (1132a to 1132c) for electrically connecting cables to an external device connection interface (I/F) 118 are provided on the right-side wall 1130 of the casing 1100. A connection port for electrically connecting a cable 120c for a display 120 to the external device connection I/F 118 described later is provided on the left-side wall 1140 of the casing 1100.

The following description uses the term "operation key(s) 108" for indicating an arbitrary one or ones of the operation keys (108a to 108e), and the term "connection port(s) 1132" for indicating an arbitrary one or ones of the connection ports (1132a to 1132c).

The arm 1200 is attached to the casing 1100 via a torque hinge 1210 and is rotatable in the vertical direction within the range of a tilt angle $\theta1$ of 135 degrees with respect to the casing 1100. FIG. 4 indicates a state in which the tilt angle $\theta1$ is 90 degrees.

The camera housing 1300 has a built-in camera 112 provided thereon, and the camera 112 can capture an image of a user, a document, a room, or the like. In addition, the camera housing 1300 has a torque hinge 1310 formed thereon. The camera housing 1300 is attached to the arm 1200 via the torque hinge 1310 and is rotatable in the vertical and horizontal directions within a range of a pan angle $\theta2$ of ±180 degrees and a tilt angle $\theta3$ of ±45 degrees with respect to the arm 1200, in which the state illustrated in FIG. 4 serves as 0 degrees.

Since the relay devices 30, the terminal management system 50, the counterpart registration system 80, the program providing system 90, and the maintenance system 100 each have the same appearance as that of a general server computer, descriptions of the appearances thereof are omitted.

Figure 5:
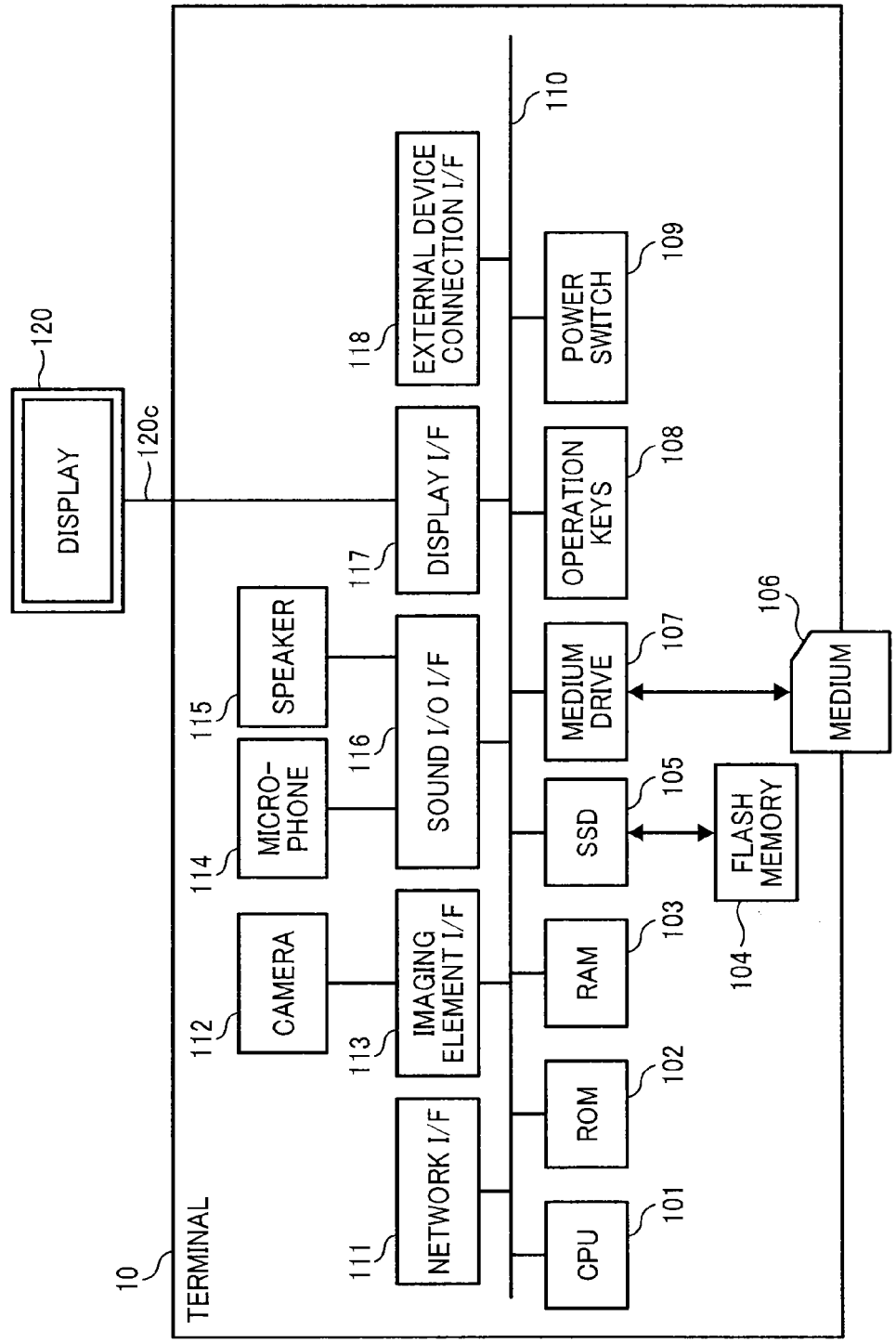
FIG. 5 is a hardware configuration diagram of the transmission terminal of FIG. 4.

FIG. 5 is a hardware configuration diagram of the transmission terminal. As illustrated in FIG. 5, the transmission terminal 10 of the embodiment includes a central processing unit (CPU) 101 that controls the entire operation of the transmission terminal 10, a read-only memory (ROM) 102 that stores a program used for controlling the CPU 101, such as an initial program loader (IPL), a random-access memory (RAM) 103 used as a work area for the CPU 101, a flash memory 104 that stores various types of data, such as the transmission terminal program, image data, and sound data, a solid state drive (SSD) 105 that controls reading/writing of various types of data from/to the flash memory 104 under control of the CPU 101, a medium drive 107 that controls reading/writing (storage) of data from/to a carrier medium 106 such as a flash memory, the operation keys 108 operated in the case of, for example, selecting a counterpart terminal for the transmission terminal 10, the power switch 109 for turning ON/OFF the power of the transmission terminal 10, and a network interface (I/F) 111 for transmitting data using the communication network 2.

In addition, the transmission terminal 10 includes the built-in camera 112, which captures an image of a subject and obtains image data under control of the CPU 101, an imaging element I/F 113 that controls driving of the camera 112, the built-in microphone 114, which receives a sound input, the built-in speaker 115, which outputs sound, a sound input/output I/F 116 that processes inputting/outputting of a sound signal between the microphone 114 and the speaker 115 under control of the CPU 101, a display I/F 117 that transmits image data to an external display 120 under control of the CPU 101, the external device connection I/F 118 connected to a connection port 1021g illustrated in FIG. 4 in order to connect various external devices, the alarm lamp 119, which indicates an abnormality of various functions of the transmission terminal 10, and a bus line 110 such as an address bus and a data bus for electrically connecting the above-described elements as illustrated in FIG. 5.

The display 120 may be implemented by a liquid crystal display or organic electroluminescence (EL) display, which displays an image of a subject, an operation icon, or the like. In addition, the display 120 is connected to the display I/F 117 by the cable 120c. The cable 120c may be an analog red green blue (RGB) (video graphic array (VGA)) signal cable, a component video cable, a high-definition multimedia interface (HDMI) signal cable, or a digital video interactive (DVI) signal cable.

The camera 112 includes a lens system, and a solid-state imaging element that photo-electrically converts an image of a subject to electronic data. As the solid-state imaging element, for example, a complementary metal-oxide-semiconductor (CMOS) or a charge-coupled device (CCD) is used.

The external device connection I/F 118 is capable of connecting an external device such as an external camera, an external microphone, or an external speaker by using a Universal Serial Bus (USB) cable or the like. In the case where an external camera is connected, the external camera is driven in preference to the built-in camera 112 under control of the CPU 101. Similarly, in the case where an external microphone is connected or an external speaker is connected, the external microphone or the external speaker is driven in preference to the built-in microphone 114 or the built-in speaker 115 under control of the CPU 101.

Note that the camera 112, the microphone 114, and the speaker 115 need not necessarily be included in the transmission terminal 10, and the transmission terminal 10 may be connected to only an external camera, an external microphone, and an external speaker. In addition, the recording medium 106 is removable from the transmission terminal 10. In addition, a non-volatile memory that reads or writes data under control of the CPU 101 is not limited to the flash memory 104, and an electrically erasable and programmable read-only memory (EEPROM) may be used instead.

Further, the transmission terminal program may be stored in a file in an installable format or an executable format on a computer-readable recording medium such as the recording medium 106 and distributed. In addition, the transmission terminal program may be stored on the ROM 102, instead of the flash memory 104.

Figure 6:
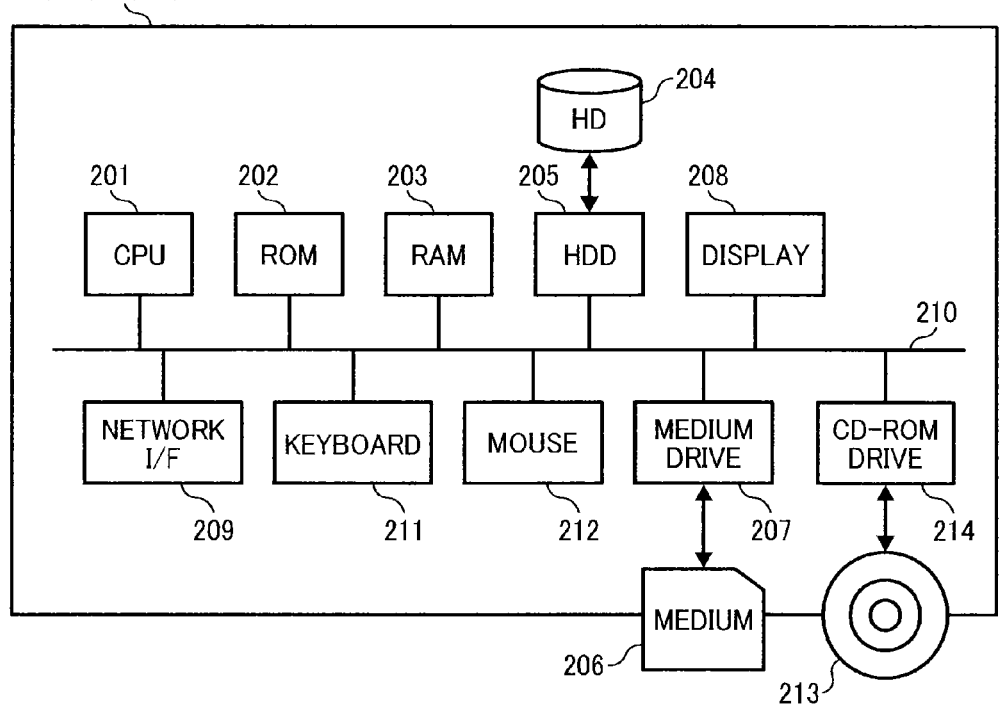
FIG. 6 is a hardware configuration diagram of a relay device, a terminal management system, a counterpart registration system, a program providing system, and a maintenance system of the transmission system of FIG. 1.

FIG. 6 is a hardware configuration diagram of any one of the relay device 30, the terminal management system 50, the counterpart registration system 80, the program providing system 90, and the maintenance system 100. For simplicity, the case for the terminal management system 50 is described below.

The terminal management system 50 includes a CPU 201 that controls entire operation of the terminal management system 50, a ROM 202 that stores a program used for controlling the CPU 201, such as an IPL, a RAM 203 used as a work area for the CPU 201, the HD 204 that stores various types of data such as the terminal management program, a hard disk drive (HDD) 205 that controls reading/writing of various types of data from/to the HD 204 under control of the CPU 201, a medium drive 207 that controls reading/writing (storage) of data from/to a recording medium 206 such as a flash memory, a display 208 that displays various types of information such as a cursor, a menu, a window, characters, or an image, a network I/F 209 for transmitting data using the communication network 2, a keyboard 211 including a plurality of keys for entering characters, numerals, and various instructions, a mouse 212 that selects and executes various instructions, selects a processing target, and moves the cursor, a compact disc read-only memory (CD-ROM) drive 214 that controls reading/writing of various types of data from/to a CD-ROM 213 serving as an example of a removable recording medium, and a bus line 210 such as an address bus and a data bus for electrically connecting the above-described elements.

Note that the terminal management program may be stored in a file in an installable format or an executable format on a computer-readable recording medium such as the recording medium 206 or the CD-ROM 213 and distributed. In addition, the terminal management program may be stored on any desired memory such as the ROM 202, instead of the HD 204.

In addition, since the relay devices 30 have a hardware configuration that is the same as or similar to that of the above-described terminal management system 50, a description thereof is omitted. Note that the HD 204 stores a relay device program for controlling the relay devices 30. Also in this case, the relay device program may be stored in a file in an installable format or an executable format on a computer-readable recording medium such as the recording medium 206 or the CD-ROM 213 and distributed. In addition, the relay device program may be stored on any desired memory such as the ROM 202, instead of the HD 204.

Further, since the counterpart registration system 80 has a hardware configuration that is the same as or similar to that of the above-described terminal management system 50, a description thereof is omitted. Note that the HD 204 stores a counterpart registration program for controlling the counterpart registration system 80. Also in this case, the counterpart registration program may be recorded in a file in an installable format or an executable format on a computer-readable recording medium such as the recording medium 206 or the CD-ROM 213 and distributed. In addition, the counterpart registration program may be stored on any desired memory such as the ROM 202, instead of the HD 204.

In addition, since the program providing system 90 and the maintenance system 100 each have a hardware configuration that is the same as or similar to that of the above-described terminal management system 50, descriptions thereof are omitted. Note that the HD 204 stores a program providing program for controlling the program providing system 90. Also in this case, the program providing program may be recorded in a file in an installable format or an executable format on a computer-readable recording medium such as the recording medium 206 or the CD-ROM 213 and distributed. In addition, the program providing program may be stored on any desired memory such as the ROM 202, instead of the HD 204. In addition, the same applies to the maintenance system 100 and a maintenance program.

Note that each of the above-described programs may be stored on a computer-readable recording medium such as a compact disc recordable (CD-R), a digital versatile disc (DVD), or a Blu-ray disc, which serve as other examples of the above-described removable recording medium, and may be provided.

<Functional Configuration>

Figure 7:
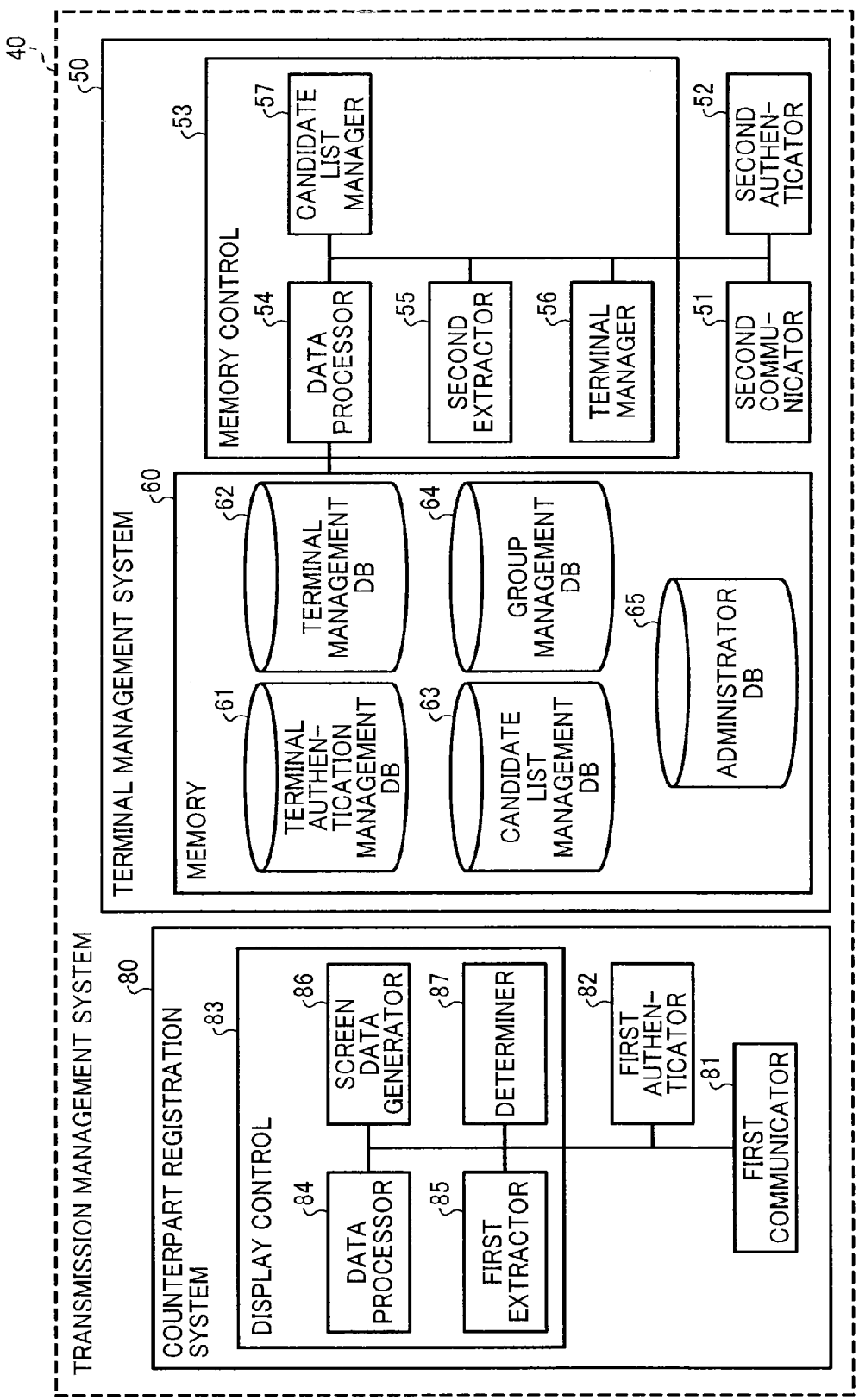
FIG. 7 is a functional block diagram of the terminal management system and the counterpart registration system included in the transmission management system of FIG. 1.

Referring to FIGS. 7 to 12, a functional configuration of the terminal management system 50 and the counterpart registration system 80 will be described, according to an example embodiment of the present invention. FIG. 7 is a functional block diagram of the terminal management system 50 and the counterpart registration system 80 included in the transmission management system 40.

(Functional Configuration of Terminal Management System)

With the hardware configuration illustrated in FIG. 6 that operates in cooperation with the terminal management program, the terminal management system 50 includes a second communicator 51, a second authenticator 52, a memory control 53, and a memory 60. The memory control 53 includes a data processor 54, a second extractor 55, a terminal manager 56, and a candidate list manager 57. The memory 60 includes a terminal authentication management DB 61, a terminal management DB 62, a candidate list management DB 63, a group management DB 64, and an administrator DB 65.

In this example, data stored in the group management DB 64 and the administrator DB 65 are one example of first association information. The data stored in the candidate list management DB 63 is one example of second association information. Further, out of the first association information, data stored in the group management DB 64 is an example of third association information, and data stored in the administrator DB 65 is an example of fourth association information.

FIG. 8 is a conceptual diagram of the terminal authentication management DB 61. The terminal authentication management DB 61 manages items of information indicating a terminal ID and a password as items of association information that are associated with each other. The terminal ID is identification information for identifying a transmission terminal 10. The terminal ID (an example of terminal identification information) may be identification information stored in advance in the transmission terminal 10, or may be identification information input by the user of the transmission terminal 10 to the transmission terminal 10. The password is a password for the transmission terminal 10 to log in to the transmission management system 40 with the terminal ID. Note that records in the terminal authentication management DB 61 may have columns (fields) other than those described above.

FIG. 9 is a conceptual diagram of the terminal management DB 62. The terminal management DB 62 manages items of information indicating a terminal ID, a name, an operation state, date/time received, and the IP address of a terminal as items of association information that are associated with one another. The terminal ID is identification information for identifying a transmission terminal 10. The name is the name of the transmission terminal 10. Alternatively, the name may be the name of the user of the transmission terminal 10, or the name of a department to which the user belongs, or the like. The operation state is the most recent operation state of the transmission terminal 10. The date/time received is the date and time at which a login request from the transmission terminal 10 to the transmission management system 40 has been received. The IP address is the IP address of the transmission terminal 10. Note that records in the terminal management DB 62 may have columns other than those described above.

FIG. 10 is a conceptual diagram of the candidate list management DB 63. The candidate list management DB 63 manages the terminal ID of a starting terminal and the terminal ID of a candidate counterpart terminal that may be a counterpart terminal as items of association information that are associated with each other. Note that records in the candidate list management DB 63 may have columns other than those described above.

FIG. 11 is a conceptual diagram of the group management DB 64. The group management DB 64 manages a group ID, a group name, and a terminal ID for identifying a transmission terminal 10 belonging to each group, as items of association information that are associated with one another. The group ID is group identification information for identifying a group (such as the first sales division or the like). Note that records in the group management DB 64 may have columns other than those described above.

FIG. 12 is a conceptual diagram of the administrator DB 65. The administrator DB 65 manages an administrator ID, a password, a group ID for identifying a group that is under management of an administrator as items of association information that are associated with one another. Here, it is indicated here that an administrator A with the administrator ID "02A" manages a group G1 with the group ID "G001" and a group G2 with the group ID "G002". In addition, it is also indicated that an administrator B with the administrator ID "02B" manages a group G3 with the group ID "G003". Further, it is also indicated that an administrator C with the administrator ID "02C" manages a group G4 with the group ID "G004". Note that records in the candidate list management DB 63 may have columns other than those described above.

Among these items of information, the administrator ID is identification information for identifying the administrator of a transmission terminal 10. The administrator ID may be the name of the administrator. The password is a password for logging in to the transmission management system 40 with the administrator ID. Note that records in the administrator DB 65 may have columns other than those described above.

Referring back to FIG. 7, the second communicator 51 communicates with a transmission terminal 10 and other systems via the communication network 2.

The second authenticator 52 authenticates a transmission terminal 10 when the transmission terminal 10 tries to log in to the terminal management system 50 (the transmission management system 40) in order to start communication with another transmission terminal 10. Specifically, the second authenticator 52 searches the terminal authentication management DB 61 of the memory 60 by using a terminal ID and a password included in login information received by the second communicator 51 as search keys. The second authenticator 52 determines whether the search keys match information in the terminal authentication management DB 61, thereby authenticating whether to permit login to the terminal management system 50.

The terminal manager 56 manages the operation state of a transmission terminal 10 that has given a login request to the transmission management system 40. The terminal manager 56 updates a record in the terminal management DB 62 that corresponds to the terminal ID of the transmission terminal 10, which has given the login request to the terminal management system 50 (the transmission management system 40). Specifically, in the case of successful login, the "operation state" is changed from offline to online (communication OK), and the "date/time received" and the "IP address" are updated.

The second extractor 55 searches the candidate list management DB 63 by using, for example, the terminal ID of the transmission terminal 10, which has given the login request to the terminal management system 50 (the transmission management system 40), as a search key, and reads a terminal ID registered as a candidate counterpart terminal for the transmission terminal 10, which has given the login request. In addition, the second extractor 55 searches the terminal management DB 62 by using the extracted terminal ID as a search key, and reads the operation state of a transmission terminal 10 for every extracted terminal ID. The read terminal ID and the operation state are transmitted to the transmission terminal 10, which has given the login request to the transmission management system 40, via the second communicator 51. With this process, a candidate list including a candidate counterpart terminal(s) is displayed on the display 120 of the transmission terminal 10, which has given the request. The user of the transmission terminal 10 selects a desired counterpart terminal from the candidate list, thereby establishing a session sed between the transmission terminals 10 and realizing communication between the transmission terminals 10.

Note that the session sed between the transmission terminals 10 may be established via the transmission management system 40 or may directly be established. In addition, the transmission terminals 10 can exchange contents data through the session sed.

The second extractor 55 can also search the candidate list management DB 63 by using the terminal ID of the transmission terminal 10, which has given the login request to the transmission management system 40, as a search key, and extract the terminal ID of a starting terminal from a record in which the terminal ID of the transmission terminal 10, which has given the login request, is registered as the terminal ID of a candidate counterpart terminal. Accordingly, the second extractor 55 searches the terminal management DB 62 by using, as a search key, the terminal ID of a starting terminal that registers the transmission terminal 10, which has given the login request, as a candidate counterpart terminal, thereby extracting a corresponding operation state.

The candidate list manager 57 adds, changes, and deletes a record to/in/from the candidate list management DB 63.

The data processor 54 performs processing to store data in the memory 60. In addition, the data processor 54 performs processing to read data stored in the memory 60.

(Functional Configuration of Counterpart Registration System)

Next, the counterpart registration system 80 will be described. With the hardware configuration illustrated in FIG. 6 that operates in cooperation with the counterpart registration program, the counterpart registration system 80 includes a first communicator 81, a first authenticator 82, and a display control 83. Further, the display control 83 includes a data processor 84, a first extractor 85, a screen data generator 86, and a determiner 87.

Among these elements, the first communicator 81, the data processor 84, and the first extractor 85 have functions that are the same as or similar to those of the second communicator 51, the data processor 54, and the second extractor 55, respectively, and hence descriptions thereof are omitted. Although the counterpart registration system 80 has no memory, the data processor 84 and the first extractor 85 can realize the same functions as those of the data processor 54 and the second extractor 55 by accessing the memory 60 of the terminal management system 50 via the communication network 2.

The first authenticator 82 authenticates a transmission terminal 10 or an administrator terminal 20 when the transmission terminal 10 or the administrator terminal 20 tries to log in to the counterpart registration system 80 (transmission management system 40) in order to add or delete a candidate counterpart terminal. Specifically, a request to add or delete a candidate counterpart terminal can be given not only from the transmission terminal 10, but also from the administrator terminal 20.

In addition, the first authenticator 82 searches the terminal authentication management DB 61 (or the administrator DB 65) of the memory 60 by using a terminal ID (or an administrator ID) and a password included in login information received by the first communicator 81 as search keys. The first authenticator 82 determines whether the search keys match information in the terminal authentication management DB 61 (or the administrator DB 65), thereby authenticating whether to permit login to the counterpart registration system 80 (transmission management system 40).

The screen data generator 86 generates screens illustrated in FIGS. 17, 18, 19, and 20 to 23. The screen data generator 86 generates a screen in, for example, HyperText Markup Language (HTML).

In addition, the data processor 84 performs the following processing. Note that the terminal ID of a management terminal is an example of management terminal identification information. The terminal ID of a starting terminal is an example of starting terminal identification information. The terminal ID of a candidate counterpart terminal is an example of candidate counterpart terminal identification information. These items of identification information include not only the terminal IDs, but also the names, serial numbers, and the like of the terminals.

In one example, the data processor 84 performs the function of registering the management terminal. For example, in response to a request for registering a specific terminal as a management terminal that is received at the first communicator 81, the data processor 84 stores a terminal ID of the specific terminal, in association with a specific administrator ID, to register the specific terminal as a management terminal to be managed by the administrator identified by the specific administrator ID. More specifically, the first association information associating one or more management terminals and the administrator, which may be managed using the group management DB 64 and the administrator DB 65, is updated to include the specific terminal as the management terminal for the specific administrator that sends the request.

The data processor 84 further performs the function of registering a candidate counterpart terminal, respectively, for the newly registered management terminal and the previously registered management terminal. For example, the data processor 84 extracts the terminal ID of each of one or more management terminals other than the specific management terminal just registered ("the newly registered management terminal"), from the first association information for the specific administrator. The data processor 84 further registers the terminal ID of the newly registered management terminal, as a candidate counterpart terminal for each one of the other management terminals of the specific administrator, by storing the terminal ID of the newly registered management terminal in association with the extracted terminal ID of each one of the other management terminals, which is a starting terminal ID, in the second association information. For example, the second association information may be managed using the candidate list management DB 63. The data processor 84 further associates the extracted terminal ID of each one of the other management terminals, with the terminal ID of the newly registered management terminal, which is a starting terminal ID, in the second association information, to register each one of the other management terminals as a candidate counterpart terminal for the newly registered management terminal.

In another example, the data processor 84 performs the function of deleting a management terminal. For example, in response to a request for deleting a specific management terminal from being under management of the specific administrator, received at the first communicator 81, the data processor 84 deletes a terminal ID of the specific management terminal, which is stored in association with a specific administrator ID of the specific administrator in the first association information, to delete the specific management terminal from the management terminals being managed by the specific administrator.

The data processor 84 further performs the function of deleting a candidate counterpart terminal, respectively, for the deleted management terminal and the registered management terminal. For example, the data processor 84 extracts the terminal ID of each one or more management terminals other than the specific management terminal being just deleted ("the deleted management terminal"), from the first association information for the specific administrator. The data processor 84 further deletes the terminal ID of the deleted management terminal, which is stored as a candidate counterpart terminal for each one of the other management terminals of the specific administrator, by deleting the terminal ID of the deleted management terminal that is stored in association with the terminal ID of the other management terminal that is a starting terminal ID, in the second association information. The data processor 84 further deletes the terminal ID of the terminal ID of each one of the other management terminals, which is stored as a candidate counterpart terminal for the deleted management terminal that is a starting terminal ID, in the second association information.

Next, a process of registering a candidate counterpart terminal managed in a candidate list will be described using FIGS. 13 and 14, and a process of deleting a candidate counterpart terminal managed in a candidate list will be described using FIG. 15.

(First Pattern)

Figure 13:
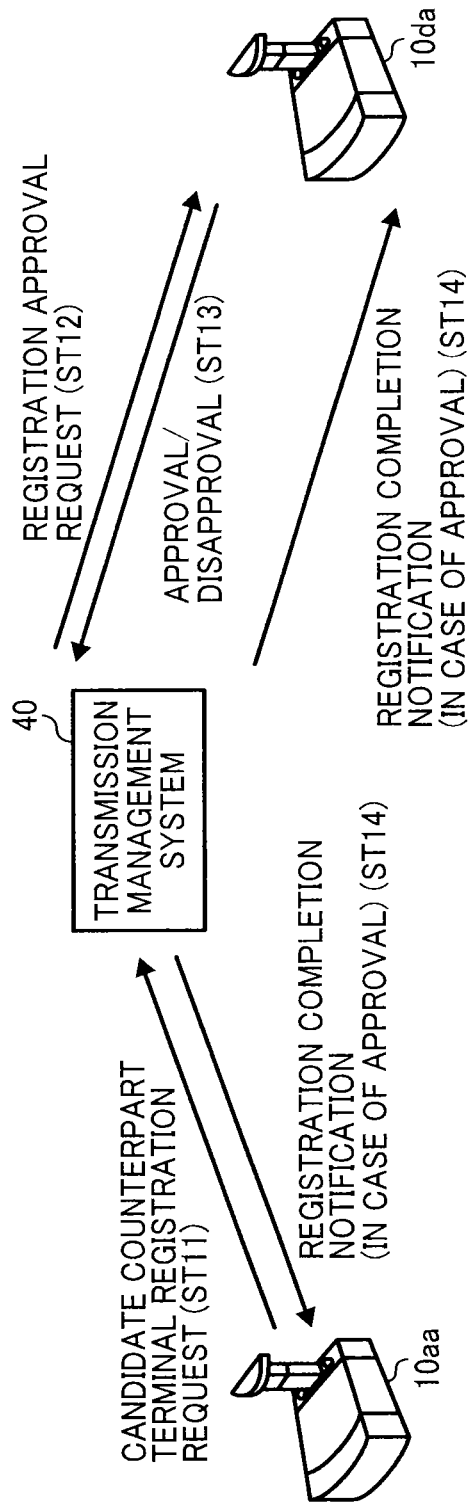
FIG. 13 is a conceptual diagram illustrating an example of a candidate counterpart terminal registration process.

A first pattern of FIG. 13, illustrates a registration process in the case where the user of the transmission terminal 10aa requests to register the transmission terminal 10da, which is in a different group, as a candidate counterpart terminal in a candidate list of the transmission terminal 10aa. Note that FIG. 13 is a conceptual diagram illustrating an example of a candidate counterpart terminal registration process.

First, the transmission terminal 10aa transmits to the transmission management system 40 a candidate counterpart terminal registration request indicating a request to register the transmission terminal 10da as a candidate counterpart terminal of the transmission terminal 10aa (ST11). Next, the transmission management system 40 transmits to the transmission terminal 10da an approval request indicating a request for approval in order to register the transmission terminal 10da as a candidate counterpart terminal of the transmission terminal 10aa (ST12). In response to this, the transmission terminal 10da transmits a response indicating approval or disapproval to the transmission management system 40 (ST13). In the case of reception of a response indicating approval, the transmission management system 40 registers the transmission terminal 10da as a candidate counterpart terminal of the transmission terminal 10aa in the candidate list management DB 63, and transmits to the transmission terminal 10aa and the transmission terminal 10da a registration completion notification indicating that counterpart registration has been completed (ST14).

(Second Pattern)

Figure 14:
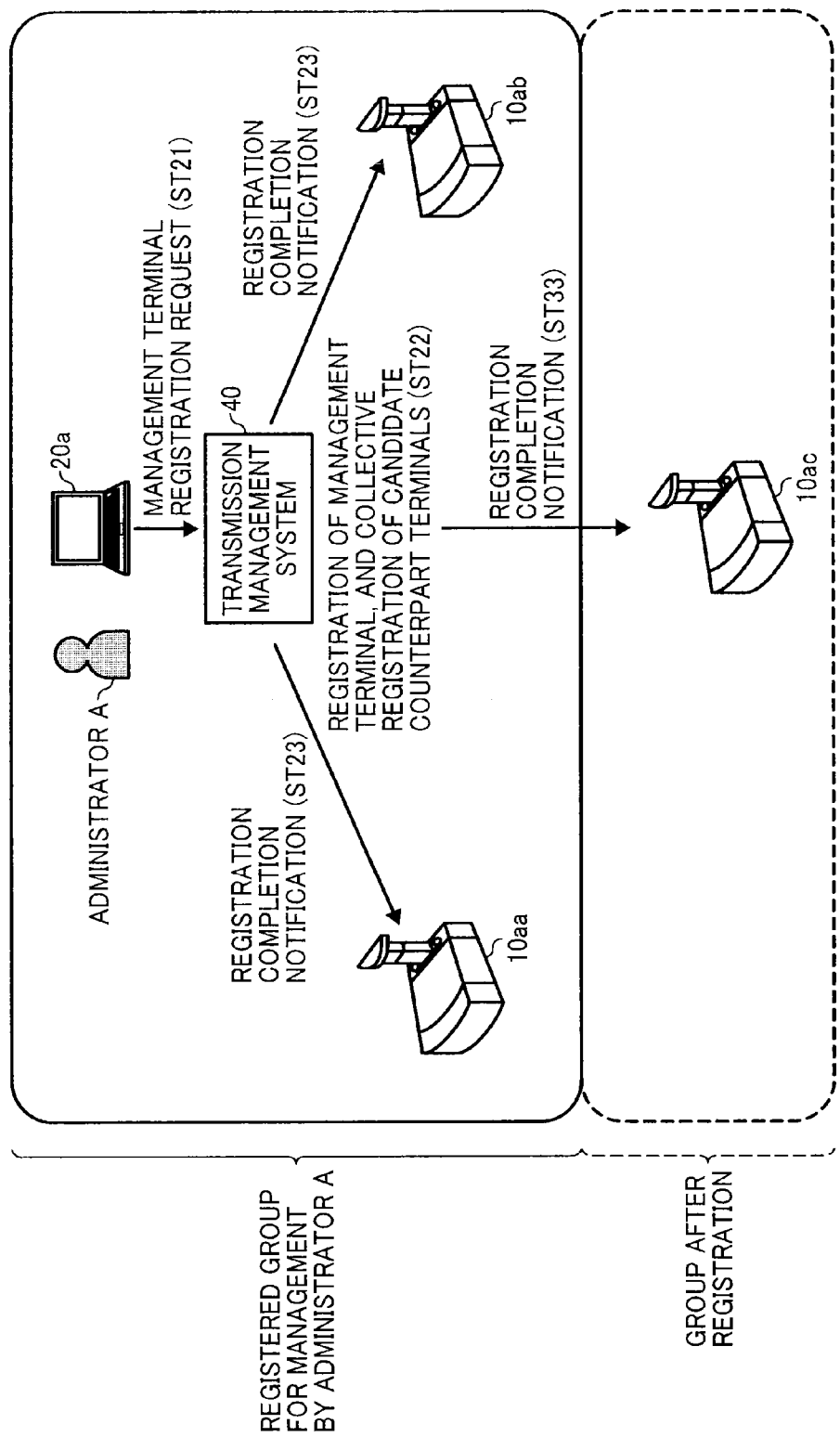
FIG. 14 is a conceptual diagram illustrating an example of a candidate counterpart terminal registration process.

A second pattern is illustrated in FIG. 14, which illustrates the case in which, when the transmission terminals 10aa and 10ab are already registered as management terminals in the group G1 managed by the administrator A, a candidate counterpart terminal registration process is also performed in the case where the transmission management system 40 newly registers the transmission terminal 10ac as a management terminal in the group G1. Note that FIG. 14 is a conceptual diagram illustrating an example of a candidate counterpart terminal registration process.

First, the administrator terminal 20a transmits, to the transmission management system 40, a management terminal registration request indicating a request to newly register the transmission terminal 10ac in the group G1 (group ID "G001") under management of the administrator A (ST21). Next, the transmission management system 40 registers the transmission terminal 10ac as a management terminal in the group G1, and performs collective registration of candidate counterpart terminals (ST22). This collective registration of candidate counterpart terminals is a process of registering the transmission terminal 10ac, which is newly registered as a management terminal, as a candidate counterpart terminal of the transmission terminals 10aa and 10ab already registered in the same group G1, and registering the transmission terminals 10aa and 10ab, which are already registered, as candidate counterpart terminals of the transmission terminal 10ac, which is newly registered in the same group G1, in the candidate list management DB 63. Accordingly, if the administrator A performs a task of registering a transmission terminal 10 as a management terminal, it is unnecessary for the administrator A or the user of each transmission terminal 10 to perform a candidate counterpart terminal registration process. In the end, the transmission management system 40 transmits, to the transmission terminals 10aa, 10ab, and 10ac, a registration completion notification indicating that the transmission terminal 10ac is included in the group G1, and that the transmission terminals 10aa, 10ab, and 10ac are registered as candidate counterpart terminals of one another (ST23).

(Third Pattern)

Figure 15:
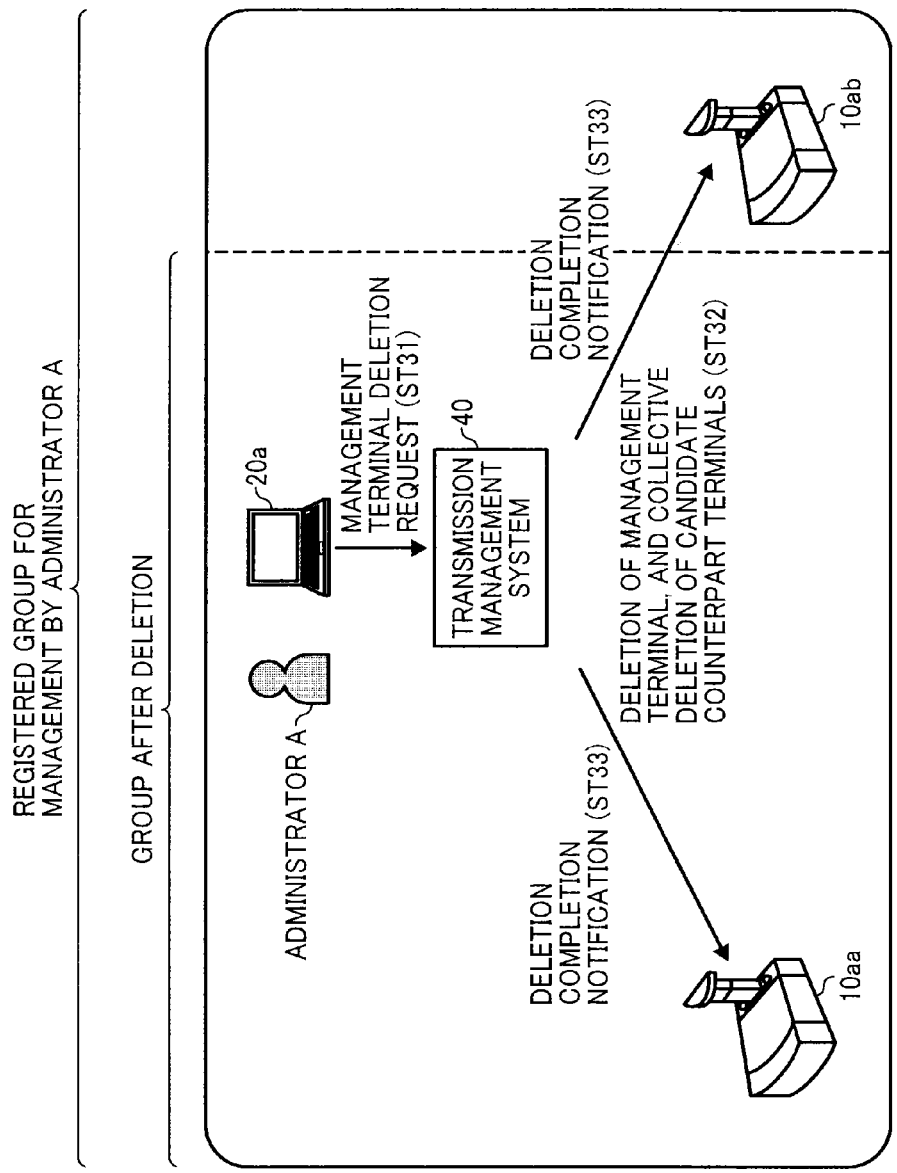
FIG. 15 is a conceptual diagram illustrating an example of a candidate counterpart terminal deletion process.

A third pattern of FIG. 15, illustrates the case in which, when the transmission terminals 10aa and 10ab are already registered as management terminals in the group G1 managed by the administrator A, a candidate counterpart terminal deletion process is performed in the case where the transmission management system 40 deletes the transmission terminal 10ab from management terminals in the group G1. Note that FIG. 15 is a conceptual diagram illustrating an example of a candidate counterpart terminal deletion process.

First, the administrator terminal 20a transmits, to the transmission management system 40, a management terminal deletion request indicating a request to delete the transmission terminal 10ab from the group G1 (group ID "G001") under management of the administrator A (ST31). Next, the transmission management system 40 deletes the transmission terminal 10ab from management terminals in the group G1, and performs collective deletion of candidate counterpart terminals (ST32). This collective deletion of candidate counterpart terminals is a process of deleting the transmission terminal 10ab, which has been deleted from management terminals, from candidate counterpart terminals of the transmission terminal 10aa registered in the same group G1, and deleting the transmission terminal 10aa from candidate counterpart terminals of the transmission terminal 10ab that used to be registered in the same group G1. Accordingly, if the administrator A performs a task of deleting a transmission terminal 10 from management terminals, it is unnecessary for the administrator A or the user of each transmission terminal 10 to perform a candidate counterpart terminal deletion process. In the end, the transmission management system 40 transmits, to the transmission terminals 10aa and 10ab, a deletion completion notification indicating that the transmission terminal 10ab is excluded from the group G1, and that the transmission terminals 10aa and 10ab are deleted from each other's candidate counterpart terminals. (ST33).

<Operation or Process>

Figure 16:
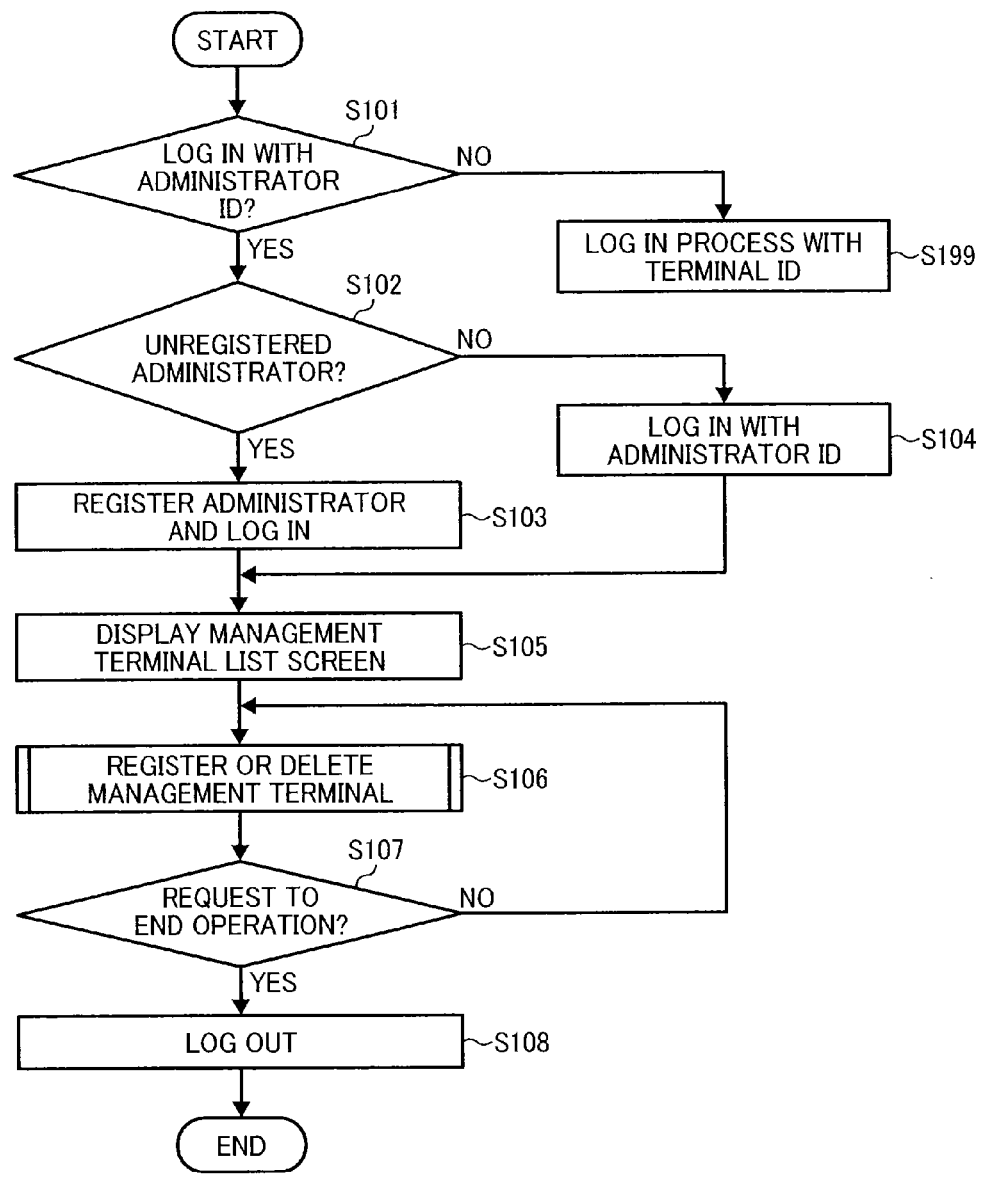
FIG. 16 is a flowchart illustrating operation of managing a terminal, performed by the transmission management system of FIG. 1, according to an example embodiment of the present invention.

Next, referring to FIGS. 16 to 23, an operation or a process of managing terminals in the embodiment will be described. FIG. 16 is a flowchart illustrating operation of managing terminals, performed by the transmission management system 40, according to an example embodiment of the present invention.

First, the first authenticator 82 of the counterpart registration system 80 determines whether a login request given with an administrator ID from an administrator terminal 20 operated by an administrator has been accepted via the communication network 2 (step S101). In the case where a login request given with an administrator ID has been accepted (Yes in step S101), the process proceeds to step S102. In the case where no login request given with an administrator ID has been accepted (a login request given from a user using a terminal ID has been accepted) (No in step S101), a login process using the terminal ID is performed (step S199). Note that, although a transmission terminal 10 operated by a user can only perform a process of registering a candidate counterpart terminal in its own candidate list, an administrator terminal operated by an administrator can perform a process of registering a candidate counterpart terminal in all the candidate lists of management terminals (transmission terminals 10 within a group under management of the administrator).

FIG. 17 is a conceptual diagram of an authentication screen of the transmission management system 40. Prior to a login request in step S101, the screen data generator 86 displays, via the first communicator 81, an authentication screen illustrated by way of example in FIG. 17 on the administrator terminal 20 operated by the administrator.

When administrator authentication is selected on the screen of FIG. 17, the counterpart registration system 80 determines to proceed to S102. When terminal authentication is selected on the screen of FIG. 17, the counterpart registration system 80 determines to proceed to S199.

Items of screen data illustrated in FIGS. 17, 18, 19, and 21 to 23 are held by the screen data generator 86 itself. Alternatively, these items of screen data illustrated in FIGS. 17, 18, 19, and 21 to 23 may be stored in the memory 60, and the data processor 84 may read these items of screen data from the memory 60 in response to a command from the screen data generator 86.

Referring back to FIG. 16, in the case where it has been determined in step S101 described above that a login request has been given with an administrator ID (Yes in step S101), the first authenticator 82 determines whether administrator information, such as the administrator ID or password, is unregistered in the administrator DB 65 (step S102). In the case where administrator information is registered in the administrator DB 65 (No in step S102), the first authenticator 82 permits login (step S104). In contrast, in the case where administrator information is unregistered in the administrator DB 65 (Yes in step S102), the screen data generator 86 displays, via the first communicator 81, a registration screen on the administrator terminal 20 operated by the administrator, and, after administrator information input to the registration screen is registered in the administrator DB 65, the administrator logs in to the counterpart registration system 80 (step S103). An example of the case in which administrator information is unregistered in the administrator DB 65 is, for example, the case in which the administrator ID is used for the first time using an initial setting password.

FIG. 18 is a conceptual diagram of an administrator registration screen. In step S103, for example, the administrator registration screen illustrated in FIG. 18 is displayed on the administrator terminal 20.

Referring back to FIG. 16, the screen data generator 86 generates a management terminal list screen illustrated in FIG. 19, and the first communicator 81 transmits data of the management terminal list screen to the administrator terminal 20, thereby displaying the screen (step S105). FIG. 19 is a conceptual diagram of the management terminal list screen. The management terminal list screen indicates a list of transmission terminals 10 managed by the administrator.

Specifically, the first extractor 85 searches the administrator DB 65 using the administrator ID received at the counterpart registration system 80 as a search key, and obtains a group ID associated with the administrator ID. The first extractor 85 searches the group management DB 64 by using the group ID as a search key, and obtains a group name and the terminal ID of a management terminal associated with the group ID. Further, the first extractor 85 searches the candidate list management DB 63 for the terminal ID of a starting terminal by using the obtained terminal ID of a management terminal as a search key, and obtains the terminal ID of a candidate counterpart terminal associated with the terminal ID of the starting terminal. In this manner, the screen data generator 86 generates a management terminal list screen on the basis of the information obtained by the first extractor 85.

On the management terminal list screen generated as above, names and terminal IDs in the terminal management DB 62, and the terminal ID of a candidate counterpart terminal associated with the terminal ID of a starting terminal in the candidate list management DB 63 (the same as the terminal ID in the terminal management DB 62) are displayed in association with one another. In addition, for each terminal ID, a "delete" key that is pressed when deleting a transmission terminal 10 indicated by the terminal ID from management terminals is also displayed. In addition, an index indicating a group name is displayed. FIG. 19 indicates that the administrator A manages, as a plurality of groups, the group G1 (the first sales division) and the group G2 (the second sales division). Further, it is displayed that, the transmission terminal 10aa with the name "AA terminal" and the transmission terminal 10ab with the name "AB terminal" are managed as management terminals in the group G1 (the first sales division).

In addition, on the management terminal list screen, a "management terminal registration" key for newly registering a transmission terminal 10 as a management terminal, and a "group-by-group deletion" key for deleting transmission terminals 10 that are already registered as management terminals, in units of groups are displayed. That is, the "delete" key displayed for each name is pressed in the case of deleting a transmission terminal 10 indicated by this name from a group. In contrast, the "group-by-group deletion" key is pressed in the case of deleting all transmission terminals 10 in a group indicated in a currently selected index. Note that a "logout" key for logging out is also displayed. Each key is selected by pressing that key by the administrator.

Next, the (management terminal registration and deletion process) is performed (step S106). This (management terminal registration and deletion process) will be described in more detail later.

Next, the determiner 87 determines whether the operation by the administrator ends by determining whether the "logout" key has been selected (step S107). In the case where the "logout" key has been selected (Yes in step S107), the counterpart registration system 80 permits the administrator terminal 20 to log out (step S108). In the case where the "logout" key has not been selected (No in step S107), the process returns to step S106.

(Management Terminal Registration and Deletion Process)

Figure 20:
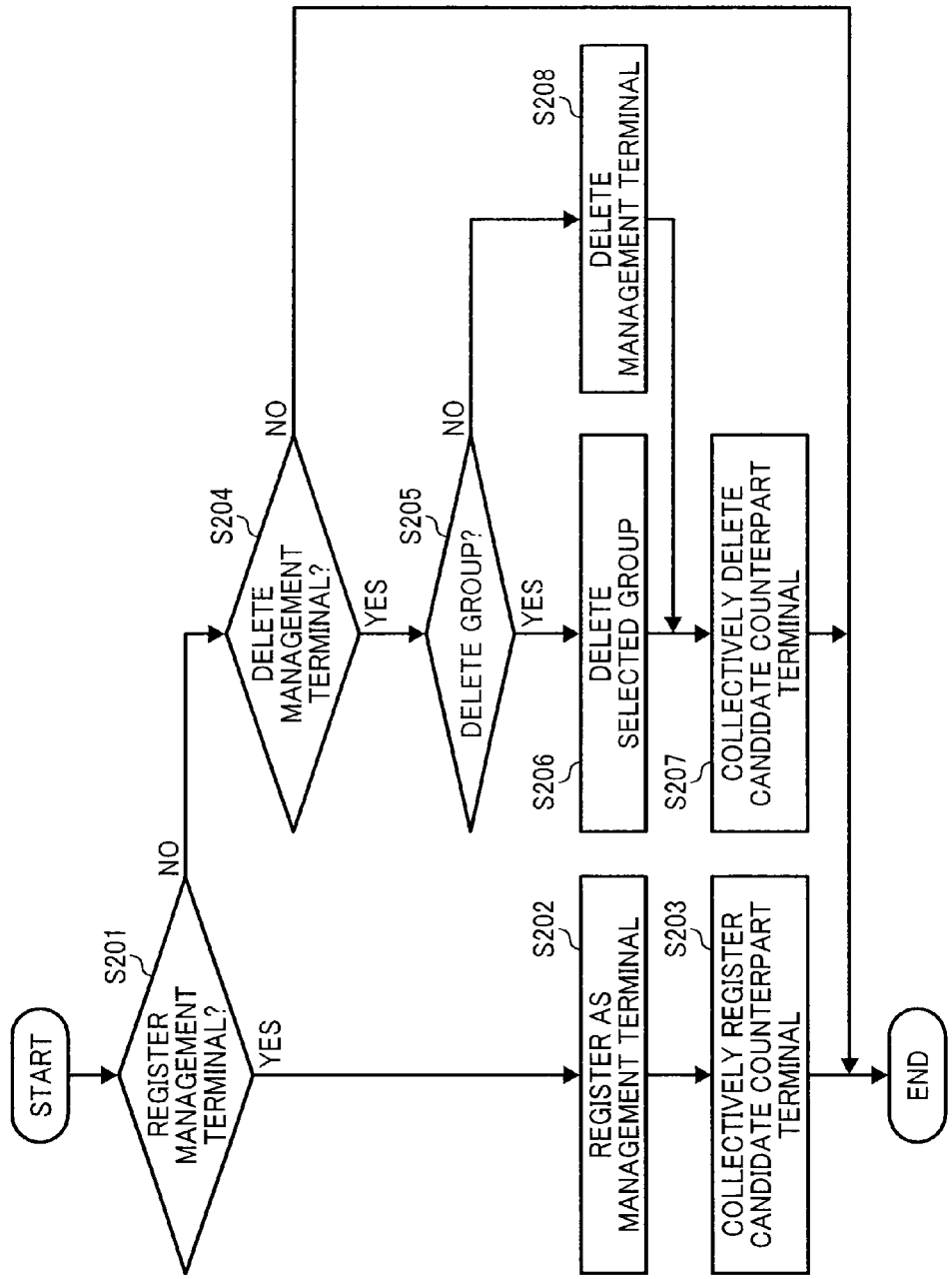
FIG. 20 is a flowchart illustrating operation of registering or deleting a management terminal, performed by the transmission management system of FIG. 1, according to an example embodiment of the present invention.

Next, using FIGS. 19 to 23, the management terminal registration and deletion process in step S106 will be described. FIG. 20 is a flowchart illustrating the management terminal registration and deletion process. FIG. 21 is a conceptual diagram of a management terminal registration screen. FIGS. 22 and 23 are conceptual diagrams of a confirmation screen for management terminal deletion.

The determiner 87 determines whether to register a management terminal by determining whether the "management terminal registration" key has been selected or the "group-by-group deletion" key or "delete" key has been selected by the administrator (step S201). In the case where the "management terminal registration" key has been selected (Yes in step S201), the screen data generator 86 transmits data of a management terminal registration screen such as that illustrated in FIG. 21 to the administrator terminal 20 via the first communicator 81.

In response to this, the administrator terminal 20 displays the management terminal registration screen such as that illustrated in FIG. 21. On the management terminal registration screen, a pull-down menu for selecting a group in which the administrator newly registers a transmission terminal 10 as his/her management terminal is displayed. On the management terminal registration screen, a plurality of input fields for inputting the terminal ID of a transmission terminal 10 (registration terminal ID) desired to be newly registered are displayed. When the administrator selects a desired group from the pull-down menu, inputs the terminal ID of a transmission terminal 10 in one of the registration terminal ID input fields, and presses a "register" key, the administrator terminal 20 transmits to the counterpart registration system 80 a registration request including the group ID indicating the group selected by the administrator, the terminal ID input in the input field, and the administrator ID of the administrator who has input these items of information. Accordingly, the first communicator 81 of the counterpart registration system 80 receives the registration request.

The data processor 84 adds, in the group management DB 64 of the terminal management system 50, the terminal ID input on the management terminal registration screen illustrated in FIG. 21 to a column of the terminal ID of a management terminal in a record including the group ID according to the group name selected on the management terminal registration screen illustrated in FIG. 21 (step S202). Accordingly, the transmission terminal 10 can be newly registered as a management terminal.

Next, the data processor 84 includes the newly added transmission terminal 10 as a candidate counterpart terminal of a transmission terminal 10 already included in the group, and includes the transmission terminal 10 already included in the group as a candidate counterpart terminal of the newly added transmission terminal 10, thereby registering the transmission terminals 10 in each other's candidate counterpart terminal (step S203). Specifically, the data processor 84 adds, in the candidate list management DB 63 of the terminal management system 50, the terminal ID of the transmission terminal 10 that is newly registered as a management terminal to a column of the terminal ID of a candidate counterpart terminal in a record in which the terminal ID of a transmission terminal 10 already included in the group selected on the management terminal registration screen illustrated in FIG. 21 is the terminal ID of a starting terminal. Further, the data processor 84 adds, in the candidate list management DB 63 of the terminal management system 50, the terminal ID of a transmission terminal 10 already included in the group selected on the management terminal registration screen illustrated in FIG. 21, to a column of the terminal ID of a candidate counterpart terminal in a record in which the terminal ID (registration terminal ID) of the transmission terminal 10 input on the management terminal registration screen illustrated in FIG. 21 is the terminal ID of a starting terminal.

In contrast, in the case where the process is not registration of a management terminal in step S201 described above (No in step S201), the determiner 87 determines whether the process is to delete an already registered management terminal (step S204). In the case of deleting a management terminal (Yes in step S204), the determiner 87 determines whether to delete a group (step S205). Specifically, the determiner 87 determines whether the "group-by-group deletion" key or a "delete" key has been pressed on the management terminal list screen illustrated in FIG. 19. In the case where it is determined that the "group-by-group deletion" key has been pressed (Yes in step S205), the data processor 84 deletes, on the basis of a group ID indicating a group indicated in an index selected at the time the "group-by-group deletion" key has been pressed and the administrator ID used in processing in step S101 described above, a group ID associated with the administrator ID from the administrator DB 65 illustrated in FIG. 12 (step S206). For example, as illustrated in FIG. 19, in response to pressing of the "group-by-group deletion" key in a state in which the "first sales division" index has been selected on the management terminal list screen, the group ID "G001" is deleted from the administrator DB 65 illustrated in FIG. 12.

Note that, in the case where it is determined that the "group-by-group deletion" key has been pressed (Yes in step S205), before the data processor 84 deletes the above-mentioned group ID, the screen data generator 86 transmits data of a confirmation screen for management terminal deletion, illustrated in FIG. 22, to the administrator terminal 20 which is logged in, via the first communicator 81. In response to pressing of the "OK" key by the administrator in response to this, the data processor 84 starts processing in step S206 described above. In response to pressing of the "cancel" key by the administrator, the data processor 84 does not start processing in step S206 described above, and the entire process illustrated in FIG. 20 ends.

Next, the data processor 84 deletes, in the candidate list management DB 63 illustrated in FIG. 10, the terminal ID of a transmission terminal 10 included in a group to be deleted, from the terminal ID of a candidate counterpart terminal associated with the terminal ID of each starting terminal, in the case where each transmission terminal 10 similarly included in the group to be deleted serves as a starting terminal, thereby deleting the terminal IDs from each other's candidate counterpart terminals of each transmission terminal in the group to be deleted (step S207). For example, as illustrated in FIG. 19, it is assumed that the "Delete terminals by group" key is selected in a state in which the "first sales division" index has been selected on the management terminal list screen. In the candidate list management DB 63 illustrated in FIG. 10, in the case where the transmission terminal 10aa in the "first sales division" group serves as a starting terminal, the terminal ID "01ab" of the terminal 10ab similarly included in the deleted group "first sales division" is deleted from the terminal ID of a candidate counterpart terminal associated with the terminal ID "01aa" of the transmission terminal 10aa. Similarly, in the case where the transmission terminal 10ab in the "first sales division" group serves as a starting terminal, the terminal ID "01aa" of the terminal 10aa similarly included in the deleted group "first sales division" is deleted from the terminal ID of a candidate counterpart terminal associated with the terminal ID "01ab" of the transmission terminal 10ab.

Note that, even in the case where an arbitrary group under management of an administrator is to be deleted, a record itself of the terminal ID of a starting terminal in the candidate list management DB 63 illustrated in FIG. 10 is not deleted, but a terminal ID indicating each transmission terminal 10 in the group is deleted from the terminal ID of a candidate counterpart terminal.

In contrast, in the case where it is determined that a "delete" key has been pressed in step S205 (No in step S205), the data processor 84 deletes, on the basis of the terminal ID of a transmission terminal 10 where the "delete" key has been pressed and a group ID associated in the administrator DB 65 with the administrator ID used in processing in step S101 described above, the terminal ID of a management terminal associated with the group ID from the administrator DB 65 illustrated in FIG. 11 (step S208). For example, as illustrated in FIG. 19, in response to pressing of a "delete" key of the name "AB terminal" in a state in which the "first sales division" index has been selected on the management terminal list screen, the terminal ID "01ab" is deleted from the terminal ID of a management terminal associated with the group ID "G001" illustrated in FIG. 11.

Note that, in the case where it is determined that a "delete" key has been pressed (No in step S205), before the data processor 84 deletes the above-mentioned terminal ID, the screen data generator 86 transmits data of a confirmation screen for management terminal deletion, illustrated in FIG. 23, to the administrator terminal 20 which is logged in, via the first communicator 81. In response to pressing of the "OK" key by the administrator in response to this, the data processor 84 starts processing in step S208 described above. In response to pressing of the "cancel" key by the administrator, the data processor 84 does not start processing in step S208 described above, and the entire process illustrated in FIG. 20 ends.

Next, after the processing in step S208, the process proceeds to step S207. The data processor 84 refers to a record for the management terminal that is deleted at S208, which is the starting terminal, in the candidate list management DB 63. The data processor 84 deletes, from candidate counterpart terminal IDs that are associated with the deleted terminal, that is the starting terminal, the terminal IDs of one or more other terminals belonging to the same group to which the deleted terminal used to belong. The data processor 84 further deletes, for a record corresponding to each one of the one or more other terminals of the same group, that is, the starting terminal, the terminal ID of the deleted terminal, from the candidate counterpart terminal IDs associated with the other terminal of the same group.

For example, referring to the management terminal list screen of FIG. 19, it is assumed that the "Delete" key is selected for the "AB terminal", while the "First Sales Division" index is selected. Referring to FIG. 10, the data processor 84 refers to the candidate list management DB 63 to refer to a record for the terminal 10ab, that is, the starting terminal, and deletes the terminal ID "01aa" of the other terminal 10aa in the same group from candidate counterpart terminals 10 associated with the terminal ID "01aa". Similarly, the data processor 84 refers to a record for the other terminal 10aa of the same group in the candidate list management DB 63 (FIG. 10), that is the starting terminal, and deletes the terminal ID "01ab" of the terminal 10ab from candidate counterpart terminal IDs associated with the terminal ID "01aa" of the other terminal 10aa in the same group.

When the processing in step S203 or S207 ends as above, the processing in step S106 in FIG. 16 ends.

As has been described above, according to the embodiment, in response to reception of a registration request for newly registering a specific transmission terminal 10 in a group that is under management of an arbitrary administrator from an administrator terminal 20 of this administrator, the transmission management system 40 not only registers the specific transmission terminal 10 in the above-mentioned group, but also registers the specific transmission terminal 10 as a candidate counterpart terminal of another transmission terminal 10 already registered in the same group. Further, the transmission management system 40 registers this other transmission terminal 10 as a candidate counterpart terminal of the specific transmission terminal 10. Accordingly, when the administrator performs processing to newly register a transmission terminal 10 to be under management of the administrator, the transmission terminal 10 is also automatically registered in the candidate list management DB 63. Thus, there is an effect that it is no longer necessary to perform processing to register the transmission terminal 10 in the candidate list management DB 63. Further, because a target to be automatically registered in the candidate list management DB 63 is limited to one that is within a group under management of the above-mentioned administrator, certain security can be ensured.

In addition, in response to reception of a deletion request for deleting a specific transmission terminal 10 from a group that is under management of an arbitrary administrator from an administrator terminal 20 of this administrator, the transmission management system 40 not only deletes the specific transmission terminal 10 from the above-mentioned group, but also deletes the specific transmission terminal 10 from a candidate counterpart terminal of another transmission terminal 10 already registered in the same group. Further, the transmission management system 40 deletes this other transmission terminal 10 from a candidate counterpart terminal of the specific transmission terminal 10. Accordingly, when the administrator performs processing to delete a transmission terminal 10 from a group under management of the administrator, the transmission terminal 10 is also automatically deleted from the candidate list management DB 63. Thus, there is an effect that it is no longer necessary to perform processing to delete the transmission terminal 10 from the candidate list management DB 63. Further, because a target to be automatically deleted from the candidate list management DB 63 is limited to one that is within a group under management of the above-mentioned administrator, certain security can be ensured.

In addition, in response to reception of a deletion request for deleting a group itself that is under management of the above-mentioned administrator from the administrator terminal 20 of the administrator, the transmission management system 40 not only deletes the group from being under management of the administrator, but also deletes each transmission terminal 10 registered in this group from each other's candidate counterpart terminal. Accordingly, when the administrator performs processing to delete a group from being under management of the administrator, the group is also automatically deleted from the candidate list management DB 63. Thus, there is an effect that it is no longer necessary to perform processing to delete a candidate counterpart terminal from the candidate list management DB 63. Further, because a target to be automatically deleted from the candidate list management DB 63 is limited to a group under management of the above-mentioned administrator, certain security can be ensured.

Note that the transmission management system 40 is applicable to an arbitrary system as long as the system is a communication system in which transmission terminals 10 are capable of communicating with each other. For example, the transmission management system 40 is applicable to a teleconference system, a video conference system, a sound conference system, a sound phone system (including a mobile phone system), a text chat system, or a white-board sharing system. In addition, transmission terminals 10 may be dedicated terminals for the above-described communication system or game-dedicated terminals, or may be general terminals such as personal computers, smart phones, mobile phone terminals, or tablet terminals. In addition, it is sufficient for the terminal management system 50 and the counterpart registration system 80 to be information processing apparatuses including the functional blocks illustrated by way of example in FIG. 7, and the terminal management system 50 and the counterpart registration system 80 may be dedicated server apparatuses or general terminal apparatuses.

Numerous additional modifications and variations are possible in light of the above teachings. It is therefore to be understood that within the scope of the appended claims, the disclosure of the present invention may be practiced otherwise than as specifically described herein. For example, elements and/or features of different illustrative embodiments may be combined with each other and/or substituted for each other within the scope of this disclosure and appended claims.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC) and conventional circuit components arranged to perform the recited functions.

The present invention can be implemented in any convenient form, for example using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can compromise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device. The computer software can be provided to the programmable device using any storage medium for storing processor readable code such as a floppy disk, hard disk, CD ROM, magnetic tape device or solid state memory device.

The hardware platform includes any desired kind of hardware resources including, for example, a central processing unit (CPU), a random access memory (RAM), and a hard disk drive (HDD). The CPU may be implemented by any desired kind of any desired number of processor. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus.

In one example, the present invention may reside in: a transmission management system (40) that manages transmission terminals (10), including: a memory (60) that stores first association information (64, 65) in which administrator identification information for identifying an administrator that manages certain transmission terminals (10), and management terminal identification information for identifying a management terminal that is a transmission terminal (10) managed by the administrator, are associated with each other, and second association information (63) in which starting terminal identification information for identifying a starting terminal that is, among the certain transmission terminals (10), a transmission terminal (10) that gives a request to start communication, and candidate counterpart terminal identification information for identifying a transmission terminal (10) that is a candidate counterpart terminal of the starting terminal, are associated with each other; a receiver (81) that receives, under management of a specific administrator indicated by specific administrator identification information, a registration request that requests registration of a specific management terminal indicated by specific management terminal identification information; a management terminal registrant (84) that registers, based on reception, by the receiver (81), of the registration request, the specific management terminal to be under management of the specific administrator by associating the specific management terminal identification information with the specific administrator identification information in the first association information (64, 65); and a candidate counterpart terminal registrant (84) that registers, in a case where, out of the management terminal identification information associated with the specific administrator identification information in the first association information (64, 65), other management terminal identification information that is other than the specific management terminal identification information serves as starting terminal identification information in the second association information (63), a candidate counterpart terminal by associating the specific management terminal identification information as candidate counterpart terminal identification information associated by the second association information (63) with the starting terminal identification information.

In one example, in the transmission management system (40), the candidate counterpart terminal registrant (84) registers, in a case where the specific management terminal identification information serves as starting terminal identification information in the second association information (63), a candidate counterpart terminal by associating the other management terminal identification information as candidate counterpart terminal identification information associated by the second association information (63) with the starting terminal identification information.

In one example, in the transmission management system (40), the first association information (64, 65) includes third association information (64) in which the administrator identification information and group identification information for identifying a group of the management terminal under management of the administrator indicated by the administrator identification information are associated with each other, and fourth association information (65) in which the group identification information and the management terminal identification information are associated with each other.

What is claimed is:

1. A transmission management system that manages a plurality of transmission terminals, comprising:
a memory configured to store
first association information that associates administrator identification information identifying an administrator with management terminal identification information identifying one or more management terminals being managed by the administrator; and
second association information that associates, for each one of the plurality of transmission terminals, terminal identification information identifying the terminal with candidate counterpart terminal identification information for identifying one or more candidate counterpart terminals, with which the terminal is capable of requesting to start communication;
a receiver configured to receive a request for registering a specific management terminal to be under management of a specific administrator, the request including specific terminal identification information of the specific terminal to be registered and specific administrator identification information of the specific administrator; and
processing circuitry configured to
register the specific terminal identification information to the management terminal identification information being associated with the specific administrator identification information by the first association information,
determine one or more management terminals being managed by the specific administrator other than the specific terminal being registered using the first association information, and
add the specific terminal identification information of the specific terminal being registered to the candidate counterpart terminal identification information associated with each one of the determined one or more other management terminals in the second association information.

2. The transmission management system of claim 1, wherein the processing circuitry is further configured to add terminal identification information of the determined one or more other management terminals to the candidate counterpart terminal identification information associated with the specific terminal identification information of the specific terminal being registered in the second association information.

3. The transmission management system of claim 1, further comprising:
a transmitter configured to send a notification indicating that the specific terminal has been added to a list of candidate counterpart terminals, respectively, to the one or more other management terminals being managed by the specific administrator.

4. The transmission management system of claim 2, further comprising:
a transmitter configured to send a notification indicating that the one or more other terminals have been added to a list of candidate counterpart terminals, to the specific terminal being registered.

5. The transmission management system of claim 1, wherein the first association information includes:
third association information that associates, for each administrator, the administrator identification information with group identification information identifying one or more groups of management terminals being managed by the administrator; and
fourth association information that associates, for each group, the group identification information and management terminal identification information identifying one or more management terminals belonging to the group.

6. A transmission system, comprising:
the transmission management system of claim 1; and
one or more transmission terminals each connected to the transmission management system through a network.

7. A method of managing a plurality of transmission terminals, comprising:
storing, in a memory, first association information that associates administrator identification information identifying an administrator with management terminal identification information identifying one or more management terminals being managed by the administrator;
storing, in the memory, second association information that associates, for each one of the plurality of transmission terminals, terminal identification information identifying the terminal with candidate counterpart terminal identification information identifying one or more candidate counterpart terminals with which the terminal is capable of requesting to start communication;
receiving a request for registering a specific management terminal to be under management of a specific administrator, the request including specific terminal identification information of the specific terminal to be registered and specific administrator identification information of the specific administrator;
registering the specific terminal identification information to the management terminal identification information being associated with the specific administrator identification information by the first association information;
determining one or more management terminals being managed by the specific administrator other than the specific terminal being registered using the first association information; and
adding the specific terminal identification information of the specific terminal being registered to the candidate counterpart terminal identification information associated with each one of the determined one or more other management terminals in the second association information.

8. The method of claim 7, further comprising:
adding terminal identification information of the determined one or more other management terminals to the candidate counterpart terminal identification information associated with the specific terminal identification information of the specific terminal being registered in the second association information.

9. The method of claim 7, wherein the first association information includes:
third association information that associates, for each administrator, the administrator identification information with group identification information identifying one or more groups of management terminals being managed by the administrator; and
fourth association information that associates, for each group, the group identification information and management terminal identification information identifying one or more management terminals belonging to the group.

10. A non-transitory recording medium which, when executed by one or more processors, cause the processors to perform a method of managing a plurality of transmission terminals, the method comprising:

storing, in a memory, first association information that associates administrator identification information identifying an administrator with management terminal identification information identifying one or more management terminals being managed by the administrator;

storing, in the memory, second association information that associates, for each one of the plurality of transmission terminals, terminal identification information identifying the terminal with candidate counterpart terminal identification information identifying one or more candidate counterpart terminals with which the terminal is capable of requesting to start communication;

receiving a request for registering a specific management terminal to be under management of a specific administrator, the request including specific terminal identification information of the specific terminal to be registered and specific administrator identification information of the specific administrator;

registering the specific terminal identification information to the management terminal identification information being associated with the specific administrator identification information by the first association information;

determining one or more management terminals being managed by the specific administrator other than the specific terminal being registered using the first association information; and adding the specific terminal identification information of the specific terminal being registered to the candidate counterpart terminal identification information associated with each one of the determined one or more other management terminals in the second association information.

* * * * *